C. B. STILWELL.
BAG BOTTOMING MACHINE.
APPLICATION FILED JAN. 25, 1907.

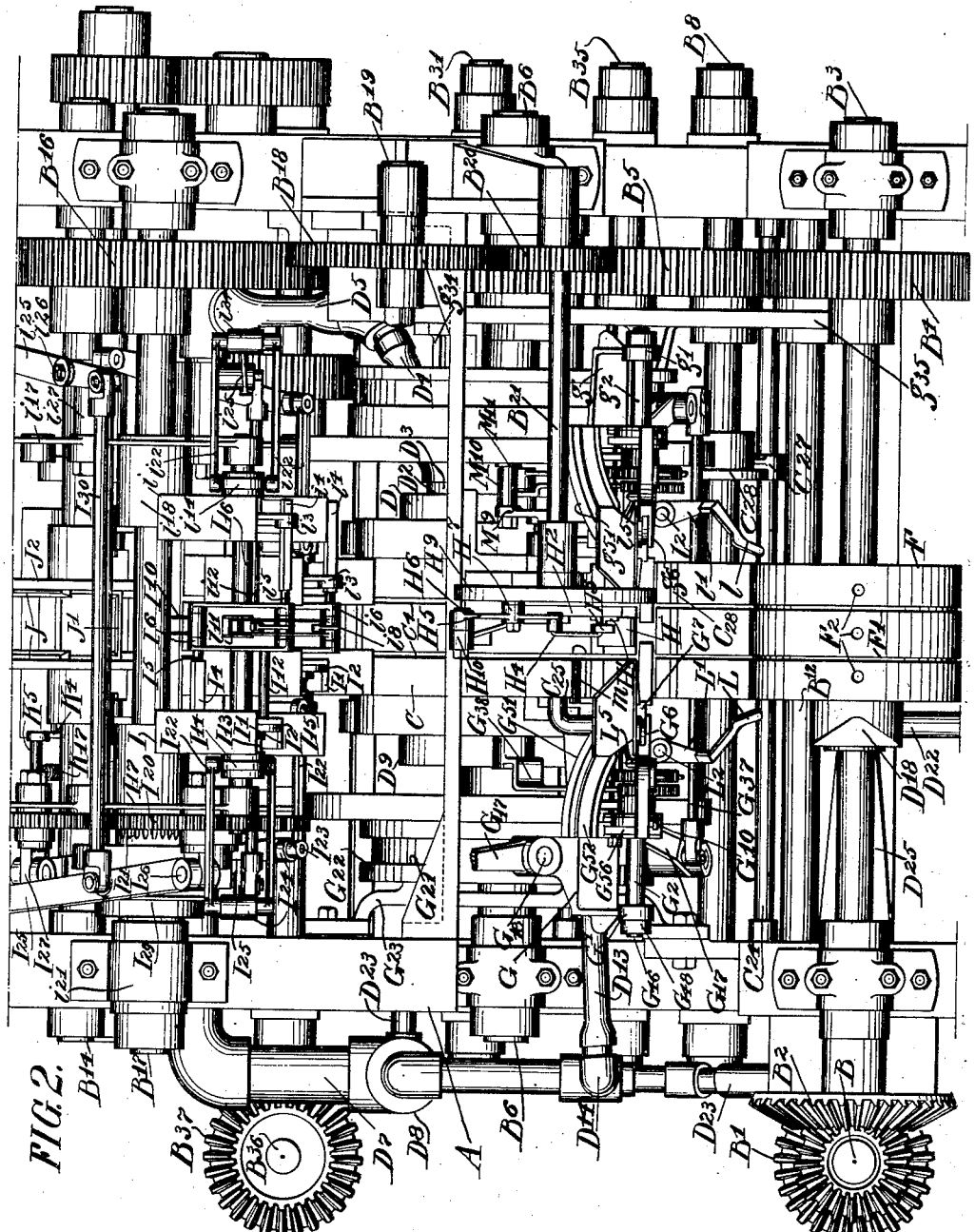

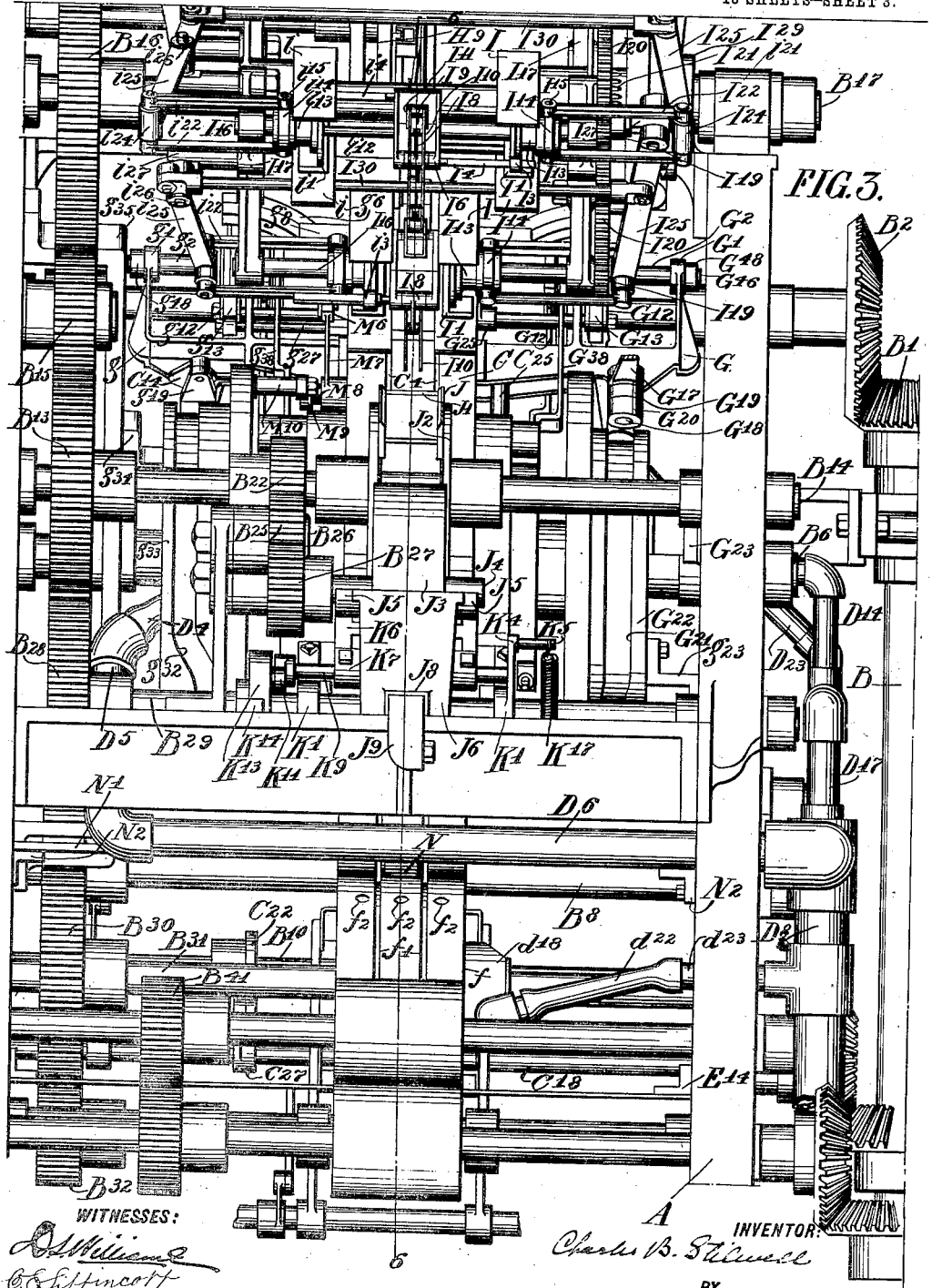

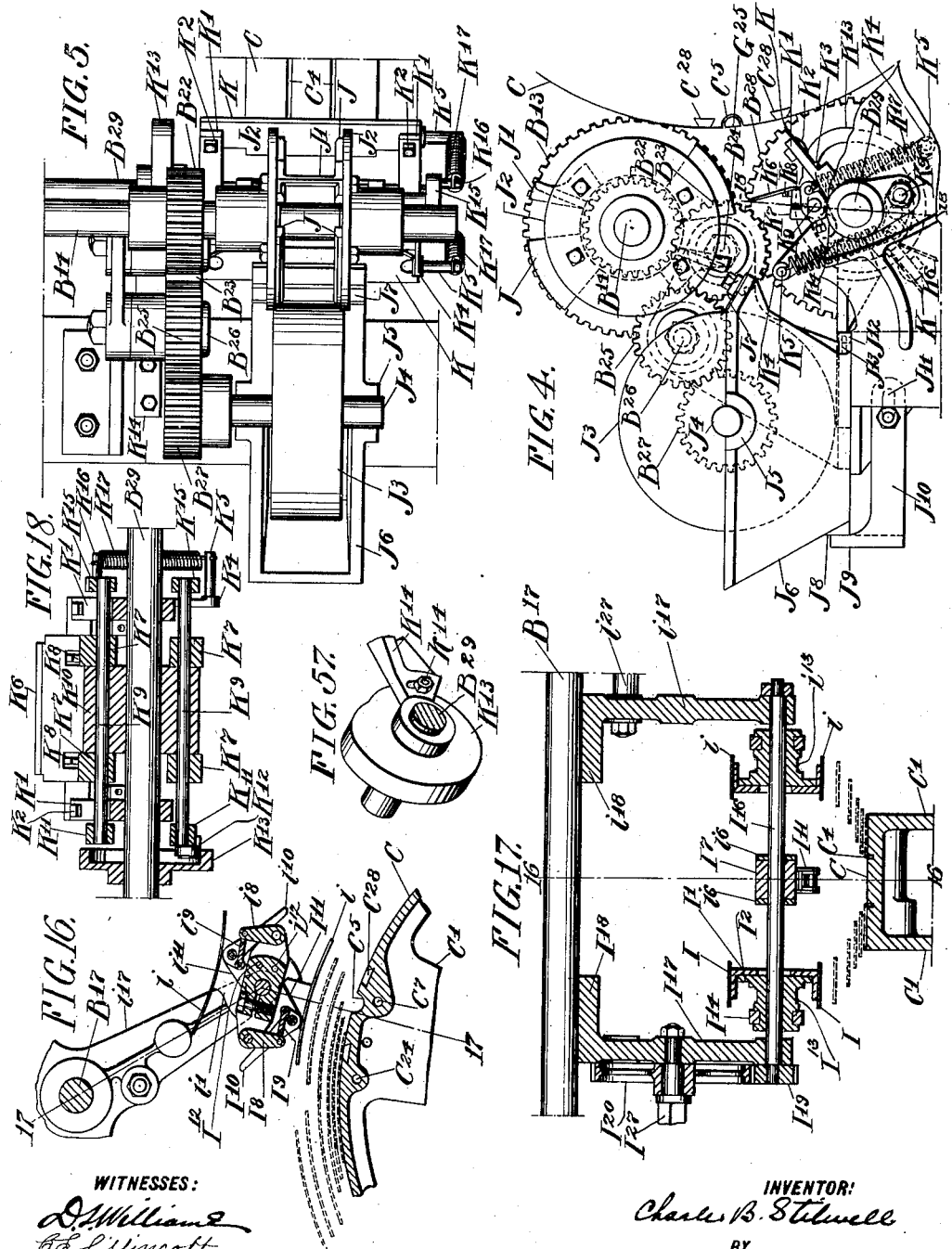

1,058,806.

Patented Apr. 15, 1913.
13 SHEETS—SHEET 6.

C. B. STILWELL.
BAG BOTTOMING MACHINE.
APPLICATION FILED JAN. 25, 1907.

1,058,806.

Patented Apr. 15, 1913.

13 SHEETS—SHEET 8.

WITNESSES:
D. A. Williams
C. C. Lippincott

INVENTOR
Charles B. Stilwell
BY
Francis D. Chamber
his ATTORNEY.

C. B. STILWELL.
BAG BOTTOMING MACHINE.
APPLICATION FILED JAN. 25, 1907.
1,058,806.
Patented Apr. 15, 1913.
13 SHEETS—SHEET 9.
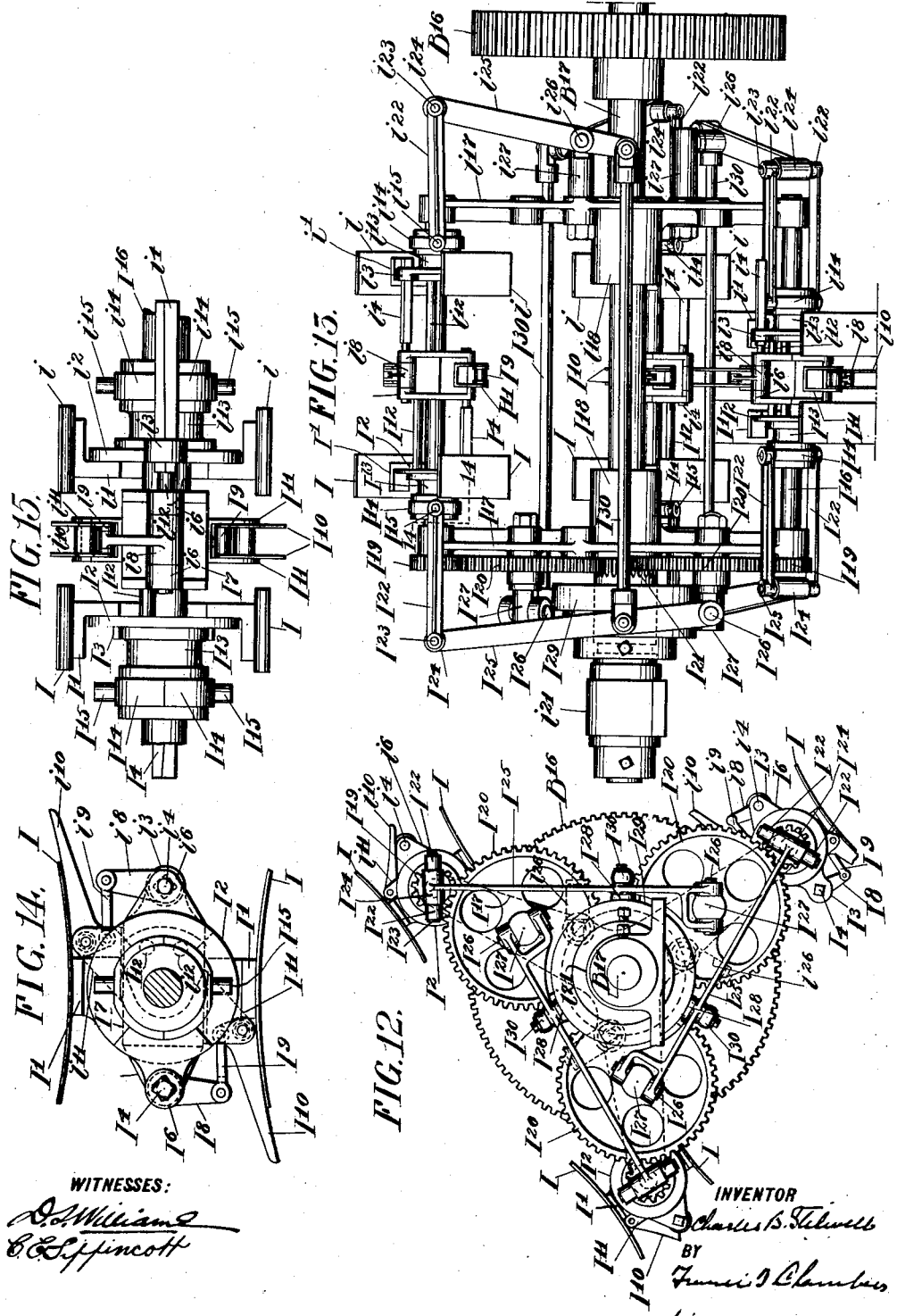

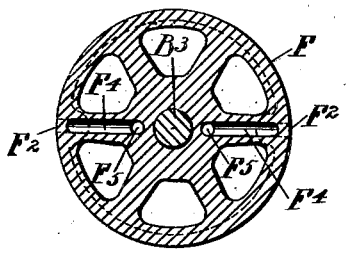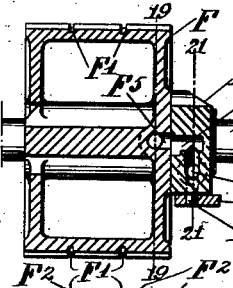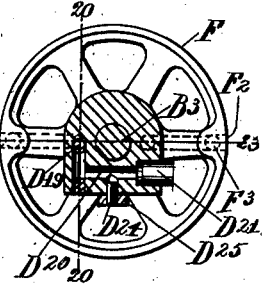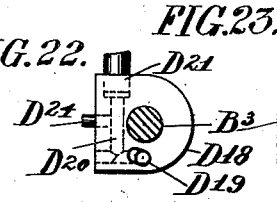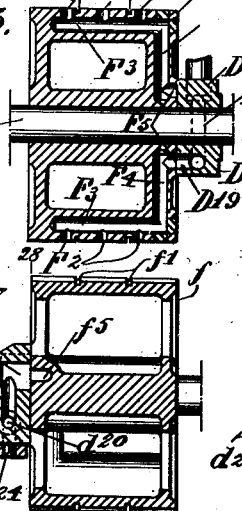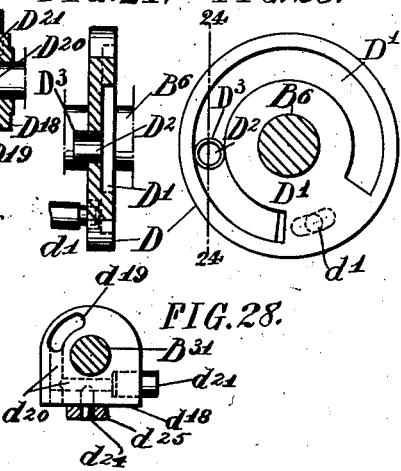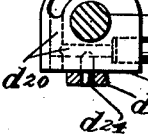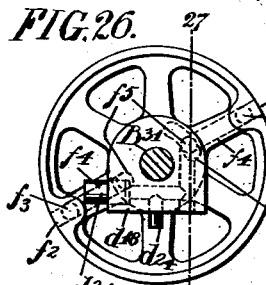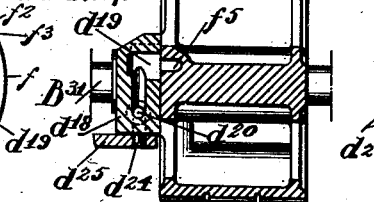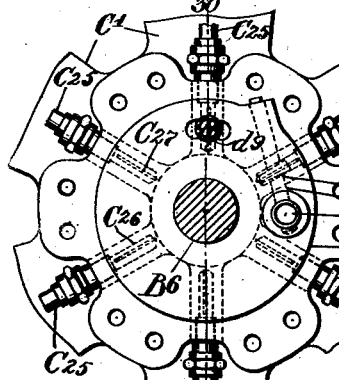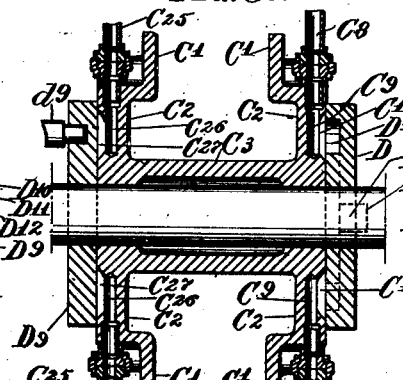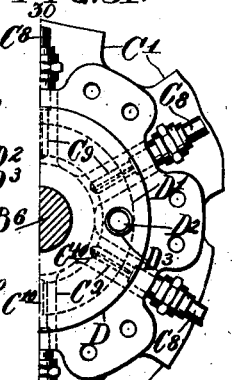

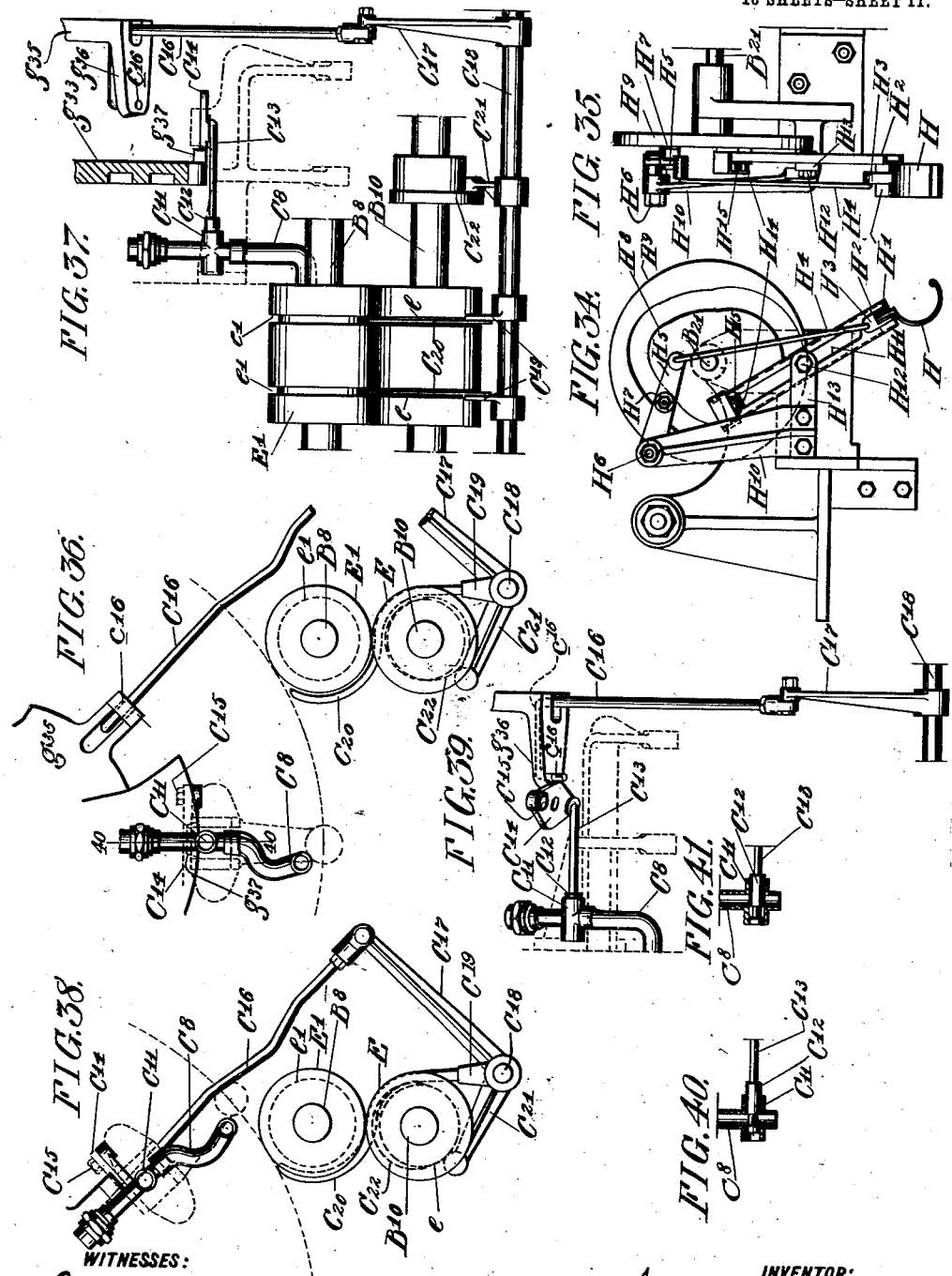

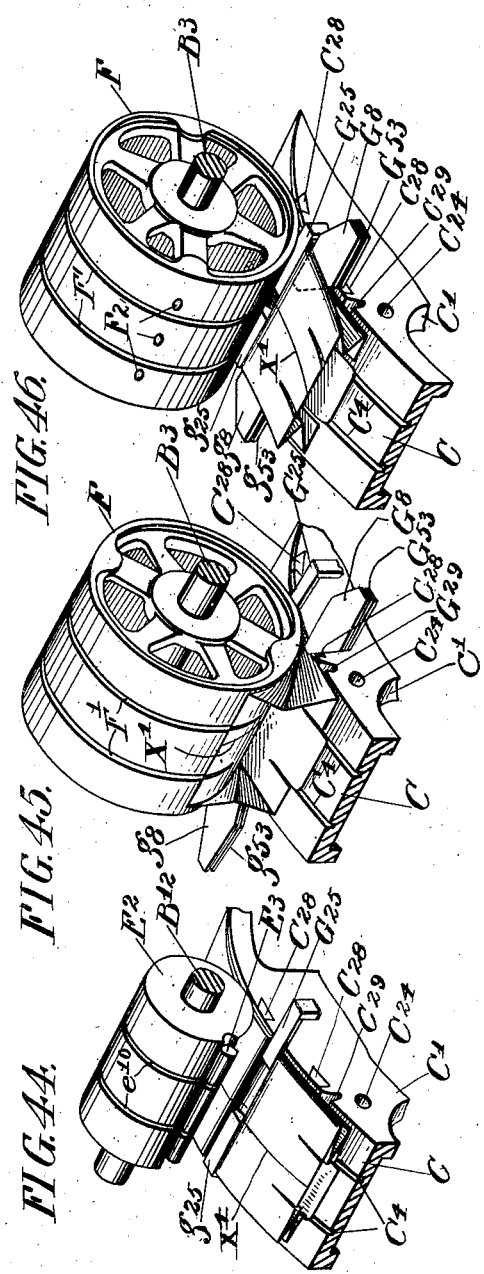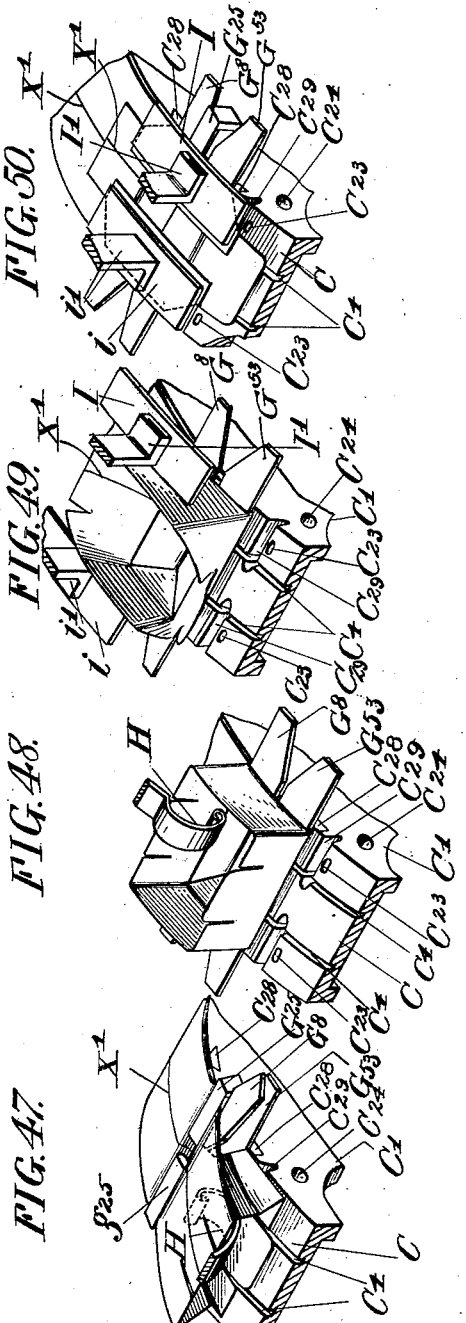

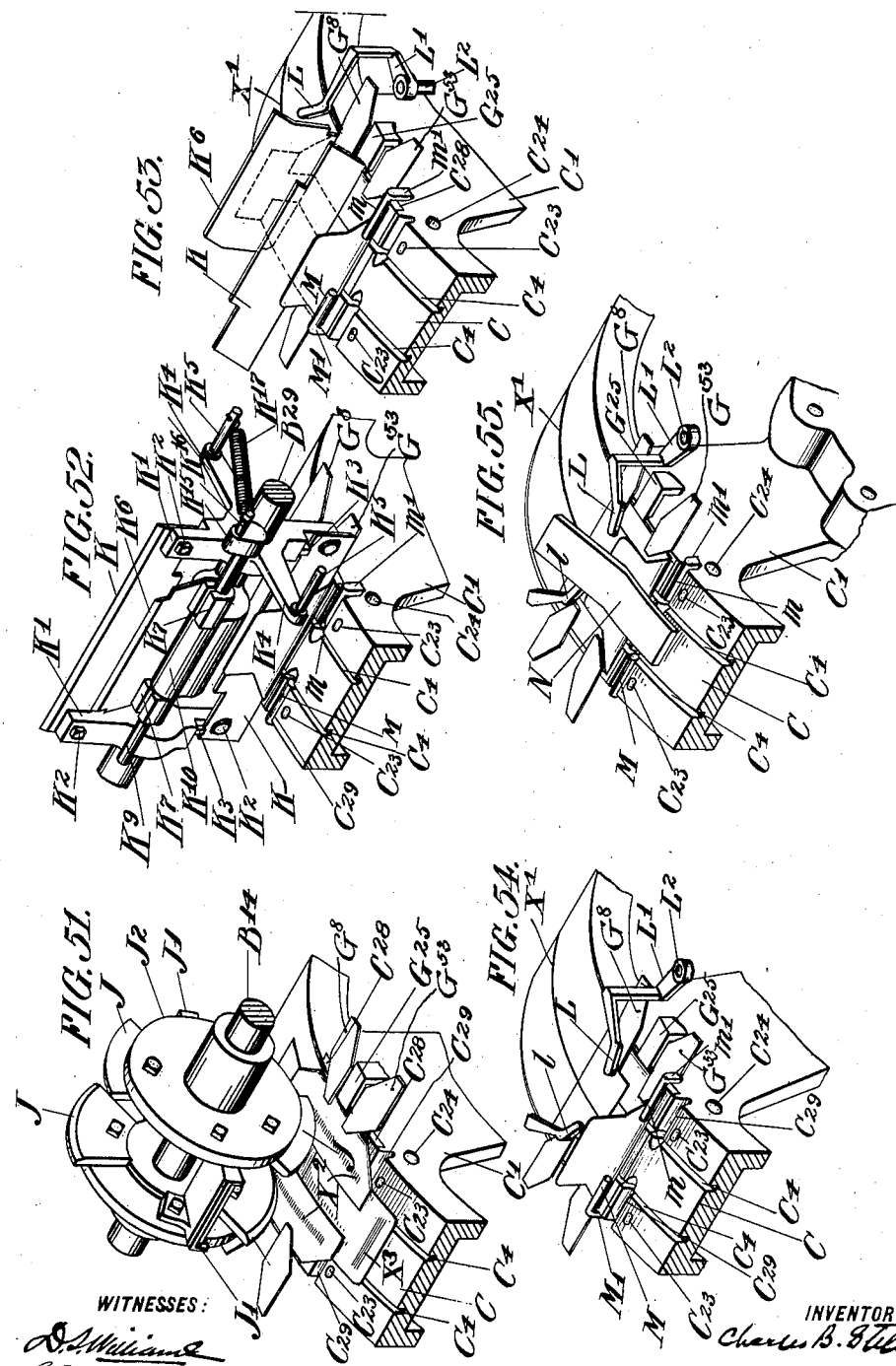

UNITED STATES PATENT OFFICE.

CHARLES B. STILWELL, OF WAYNE, PENNSYLVANIA, ASSIGNOR TO UNION PAPER BAG MACHINE COMPANY, OF PHILADELPHIA, PENNSYLVANIA, A CORPORATION OF PENNSYLVANIA.

BAG-BOTTOMING MACHINE.

1,058,806.  Specification of Letters Patent.  Patented Apr. 15, 1913.

Application filed January 25, 1907. Serial No. 354,008.

*To all whom it may concern:*

Be it known that I, CHARLES B. STILWELL, a citizen of the United States of America, residing in Wayne, in the county of Delaware and State of Pennsylvania, have invented a certain new and useful Improvement in Bag-Bottoming Machines, of which the following is a true and exact description, reference being had to the accompanying drawings, which form a part thereof.

My present invention relates to machinery for forming bottoms on tubular bag blanks and comprises novel mechanism particularly designed for rapidly and accurately converting tucked or bellows sided bag blanks into finished square bottom bags by working on the blanks in a manner in which strains tending to disrupt the paper or like material are avoided, and thereby forming the bags with a minimum of waste.

In the embodiment of my invention disclosed therein, one end of each blank is first diamond folded and then flap folded, while being supported by a rotary folding cylinder or blank support, and the latter is provided with a plurality of blank supporting surfaces or folding beds, so that in normal operation a plurality of blanks are being transported by the folding cylinder, and are undergoing manipulation at any one instant. Some of the various instrumentalities operating on the blank are carried by the folding cylinder and others are supported independently of the cylinder.

The various novel constructions and combinations which characterize the means employed for transporting the blanks and diamond and flap folding them are pointed out with particularity in the claims annexed to and forming a part of this specification. For a better understanding of my invention, however, and the advantages possessed by it, reference may be had to the accompanying drawings in which I have illustrated one form in which it may be carried out.

Figure 1:
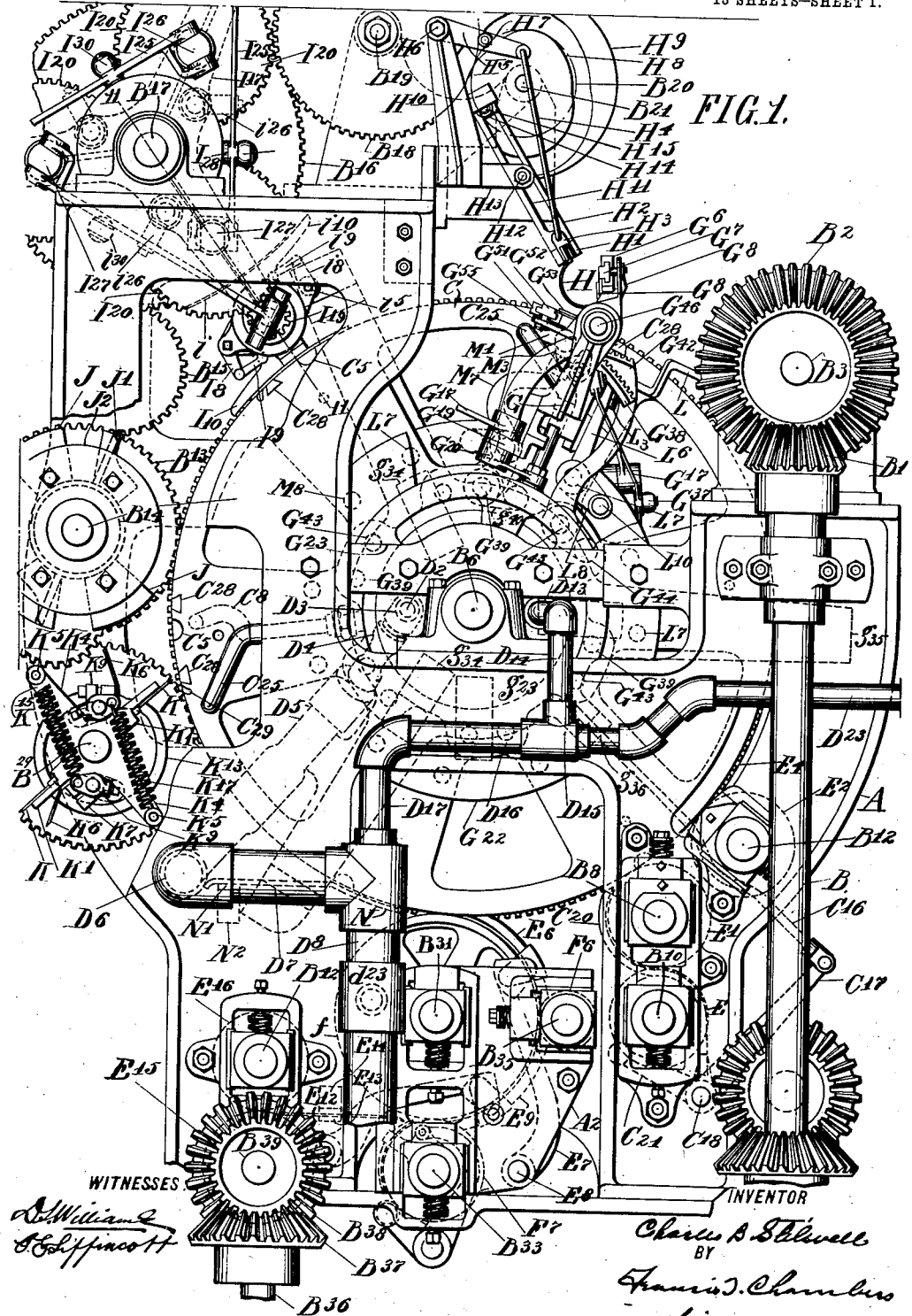
Figure 6:
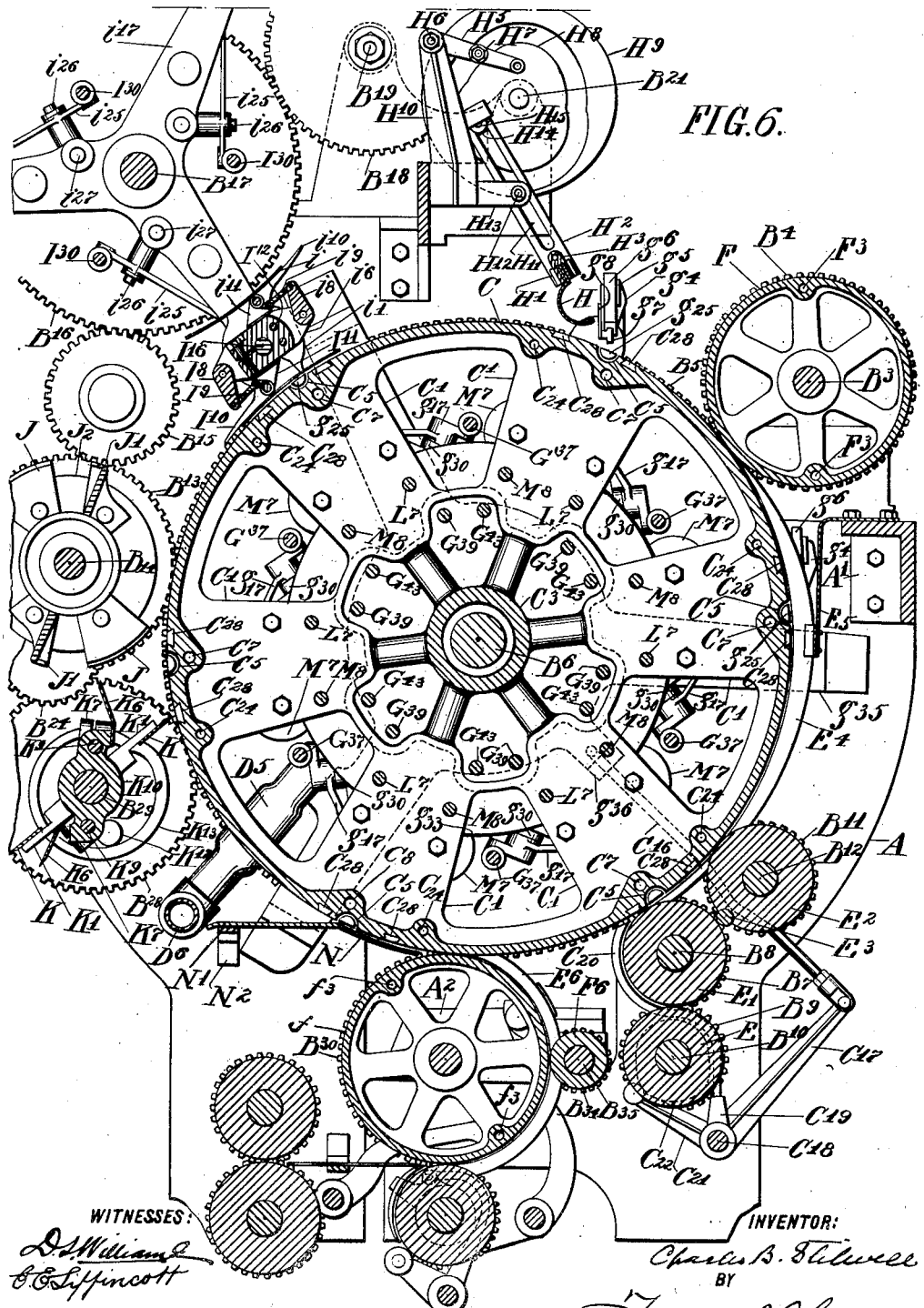
Figure 7:
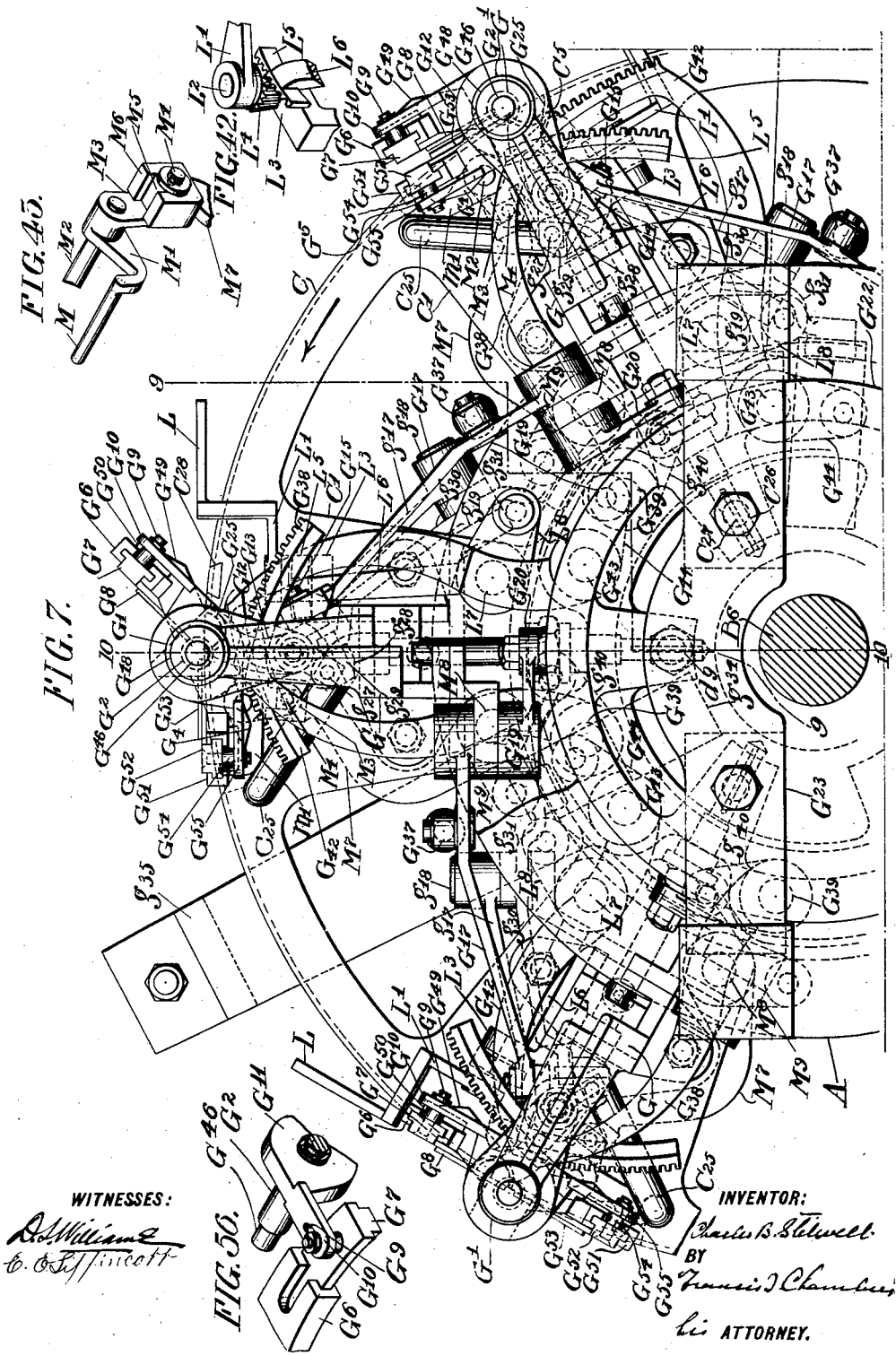
Figure 8:
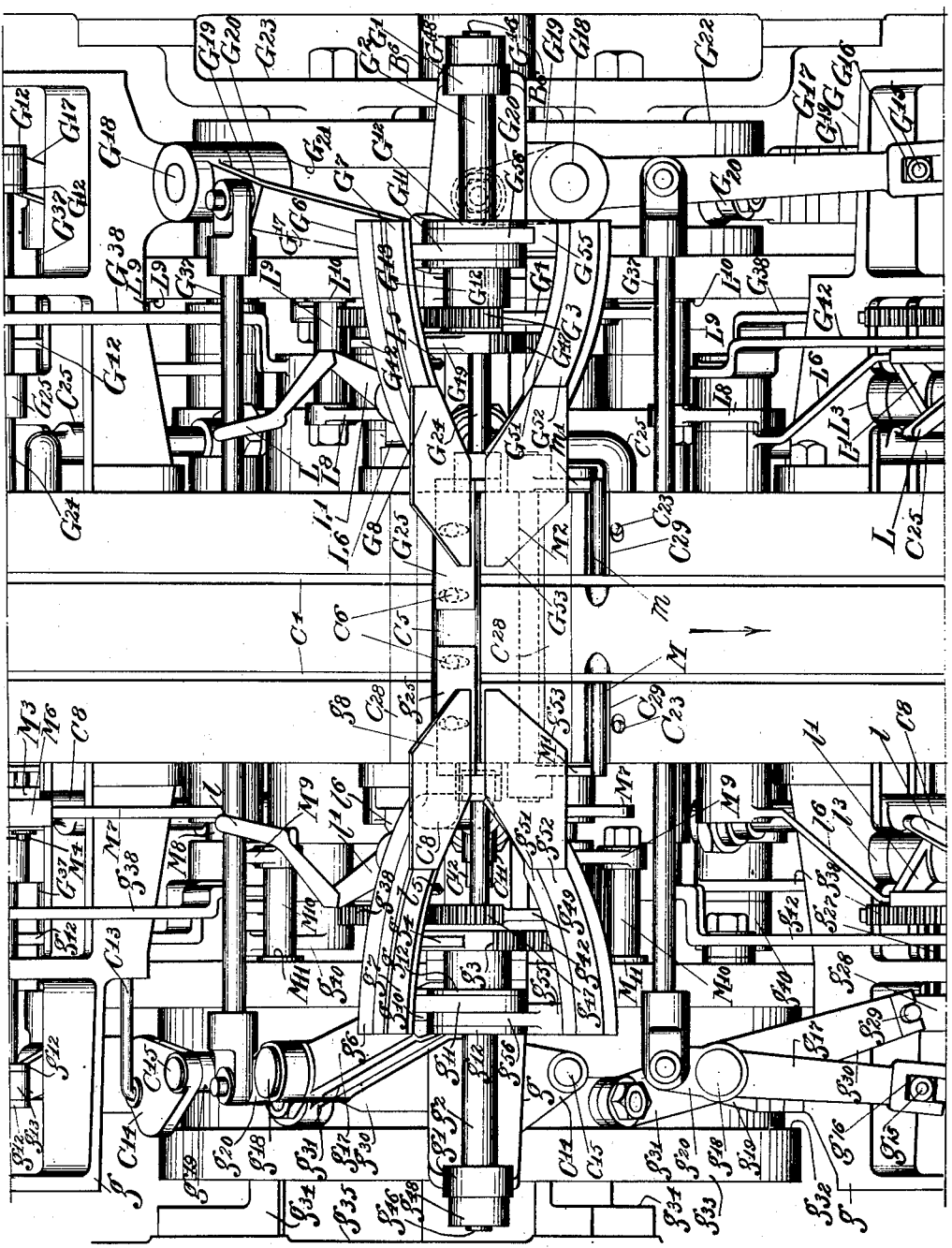
Figure 9:
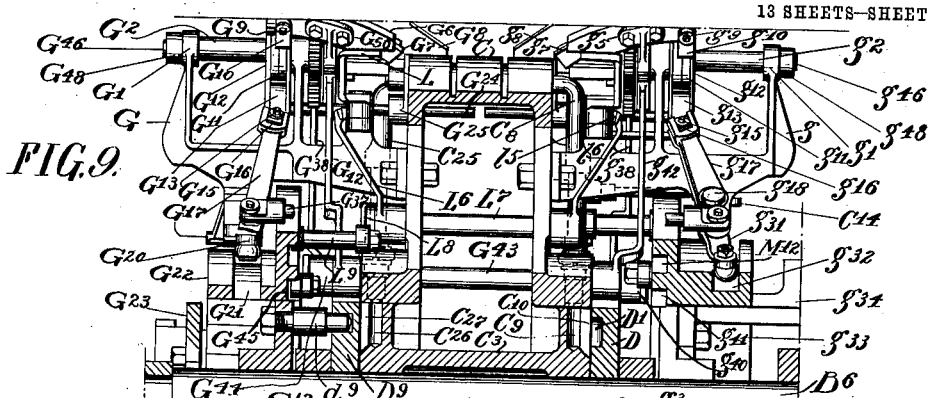
Figure 10:
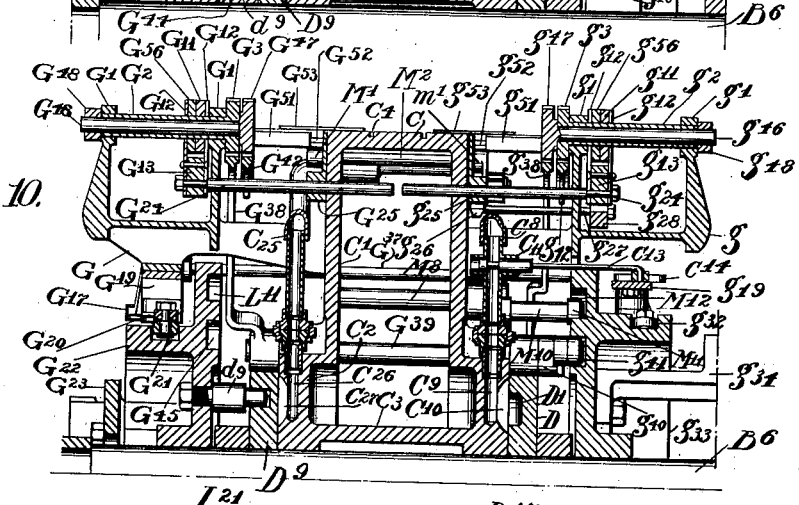
Figure 11:
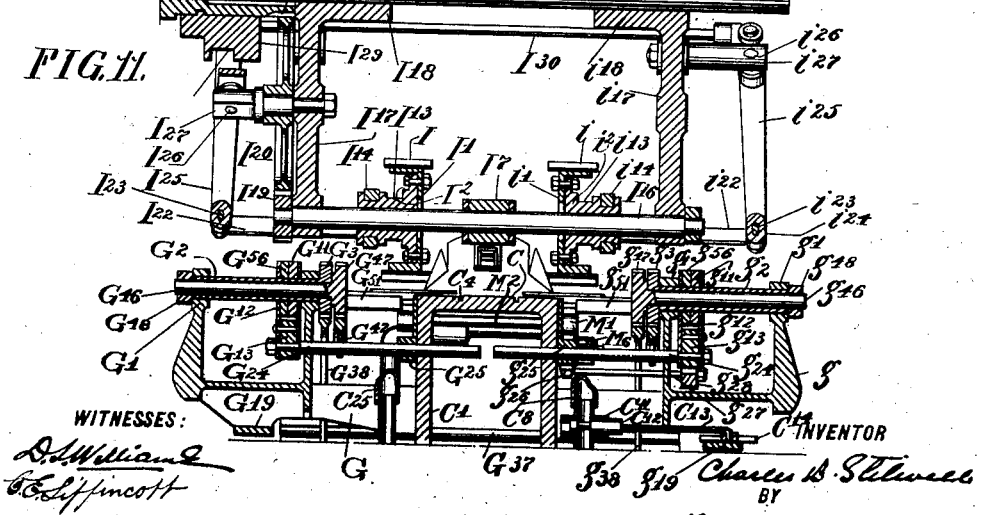

In the drawings, Figure 1 is a side elevation of the machine, looking at the front end of the folding cylinder. Fig. 2 is a plan view of the machine. Fig. 3 is an elevation of the machine, taken at right angles to Fig. 1. Fig. 4 is a view taken similarly to Fig. 1 with parts broken away, showing the pasting and flap creasing devices. Fig. 5 is a plan view of the mechanism shown in Fig. 4. Fig. 6 is a sectional elevation on the line 6—6 of Fig. 3. Fig. 7 is an enlarged view taken similarly to Fig. 1, showing a portion of the folding cylinder and folding mechanism carried by it. Fig. 8 is a plan view of the mechanism shown in Fig. 7. Fig. 9 is a sectional view of a portion of the folding cylinder taken on the line 9—9 of Fig. 7. Fig. 10 is a view similar to Fig. 9, taken on the line 10—10 of Fig. 7. Fig. 11 is a sectional view showing a portion of the folding cylinder and the flattening mechanism, and taken on the line 11—11 of Fig. 1. Fig. 12 is an end elevation of the flattening mechanism. Fig. 13 is a rear view of the mechanism shown by Fig. 12. Fig. 14 is an enlarged detached end view of a portion of the flattening mechanism, partly in section on the line 14—14 of Fig. 13. Fig. 15 is a rear view of the mechanism shown by Fig. 14. Fig. 16 is a sectional elevation on the line 16—16 of Fig. 17, illustrating the movement of the flattening wings during the flattening operation. Fig. 17 is a section on the line 17—17 of Fig. 16. Fig. 18 is a sectional view on the line 18—18 of Fig. 4, illustrating the construction of the flap creasing mechanism. Fig. 19 is a sectional elevation of the flap lifting roll taken on the line 19—19 of Fig. 20. Fig. 20 is a sectional elevation taken on the line 20—20 of Fig. 21. Fig. 21 is a sectional elevation of the air box for the flap lifting roll taken on the line 21—21 of Fig. 20. Fig. 22 is a front detached view of the air box for the flap lifting roll F. Fig. 23 is a sectional elevation taken on the line 23—23 of Fig. 21. Fig. 24 is a sectional elevation on the line 24—24 of Fig. 25. Fig. 25 is an end elevation of the rear air box shown in Fig. 30. Fig. 26 is an end elevation of the suction roll for removing the bags from the folding cylinder. Fig. 27 is a section on the line 27—27 of Fig. 26. Fig. 28 is a section on the line 28—28 of Fig. 27, looking in the direction indicated by the arrows. Fig. 29 is a front view of a portion of the folding cylinder and front air box. Fig. 30 is a section on the line 30—30 of Fig. 29. Fig. 31 is a rear view of a portion of the mechanism shown in front elevation in Fig. 29. Fig. 32 is a sectional elevation of the front air box of Fig. 30, taken on the line 32—32 of Fig. 33. Fig. 33 is a sectional elevation taken on the line 33—33 of Fig. 32. Fig. 34 is a front elevation of the mechanism for holding the overlapping tube seam edges against relative movement during the folding operation. Fig. 35 is an elevation taken at right angles to Fig. 34. Fig. 36 is an elevation of the mechanism for controlling valves in the connections to the exhaust apparatus. Fig. 37 is an elevation, partly in section, of the mechanism shown in Fig. 36 viewed from the right of that figure. Fig. 38 is a view similar to Fig. 36, showing the parts in different position. Fig. 39 is a portion of the mechanism shown in Fig. 38 viewed from the left hand side. Fig. 40 is a section of a portion of the air pipe and valve on the line 40—40 of Fig. 36, showing the valve open. Fig. 41 is a similar view, showing the valve closed. Fig. 42 (on same sheet with Fig. 7) is a detached perspective of a portion of the mechanism for folding the back flaps. Fig. 43 is a detached perspective of a portion of the mechanism for holding the front flaps in an elevated position. Fig. 44 is a perspective view showing relative positions of a portion of the folding cylinder and bull-nose roll, shortly after the bull-nose has depressed a portion of a bag blank into the cylinder. Fig. 45 is a perspective view illustrating the operation of the flap lifting roll. Fig. 46 is a view similar to Fig. 45, showing the position of the same parts at a slightly later stage. Fig. 47 is a perspective view illustrating the beginning of the box forming operation. Fig. 48 is a perspective view showing the position of the parts at the conclusion of the box opening operation. Fig. 49 is a perspective view showing the curved flattener wings in position to begin the box flattening operation. Fig. 50 shows the same parts as Fig. 49 at the conclusion of the flattening operation. Fig. 51 is a perspective view illustrating the operation of the pasting devices. Figs. 52 and 53 are perspective views illustrating the operation of the flap creasing devices. Fig. 54 is a perspective view illustrating the operation of the back flap folding devices, and the front flap lifting devices Fig. 55 is a perspective view illustrating the operation of the front flap folding means. Fig. 56 (on same sheet as Fig. 7) is a perspective detached view illustrating the means for sliding one of the turning back wing slides in its curved guide. Fig. 57 (on same sheet with Figs. 4 and 5) is a detached perspective view, showing a portion of the bottom creasing mechanism.

It should be remarked that in several views parts have been omitted when their absence would not be misleading in order to avoid unnecessary complexity.

In the drawings, A designates the main stationary framework of the machine by which are supported the shafts, brackets, etc. The vertical shaft B is the main driving shaft. Through beveled gears $B^1$ and $B^2$, shaft B drives a horizontal shaft $B^3$. Shaft $B^3$ through gears $B^4$, $B^5$, $B^7$, $B^9$, $B^{11}$, $B^{13}$, $B^{15}$, $B^{16}$, $B^{18}$ mounted on stud $B^{19}$; $B^{20}$, $B^{22}$, $B^{23}$ mounted on stud $B^{24}$; $B^{25}$ mounted on stud $B^{26}$; $B^{27}$, $B^{28}$, $B^{30}$, $B^{32}$, and $B^{34}$ drive the various horizontal shafts parallel to $B^3$, designated by symbols $B^6$, $B^8$, $B^{10}$, $B^{12}$, $B^{14}$, $B^{17}$, $B^{21}$, $J^4$, $B^{29}$, $B^{31}$, $B^{33}$ and $B^{35}$.

The rotating blank support or folding cylinder C is carried by the shaft $B^6$ on which it is secured. The rim of the folding cylinder is connected to the webs $C^2$ extending radially from the ends of hub $C^3$ by arms $C^1$. The folding cylinder is of the multiple folding bed type, that is, it is adapted to hold at one time a plurality (a half dozen) of bag blanks which are in various stages in their progress toward the completed form. The blanks are fed successively to the folding cylinder as the latter rotates by the feed rolls E and $E^1$ (see Fig. 6). The roll $E^2$ adjacent the roll $E^1$ is provided at one portion of its periphery with an axially extending, partially sunken, roller-like member or "bull-nose" $E^3$ which is shorter than the width of the blanks operated upon as shown in Fig. 44, and depresses a portion of each blank into one of the axially extending recesses $C^5$ formed in the periphery of the folding cylinder. There is one of these recesses $C^5$ formed in the folding cylinder for each of the plurality of folding beds and the forward edge of each recess, having reference to the direction of rotation of the folding cylinder, is practically coincident with and assists in determining the primary transverse cross fold line of the blank diamond folded on the folding bed to which the recess belongs. The blanks are retained in the recesses $C^5$ partly by the tongues or fingers $G^{25}$ and $g^{25}$ which are moved axially into the recesses from the front and back sides of the folding cylinder over the paper in a manner hereinafter described. The paper is also held in the recesses by air suction. For this purpose, ports or suction holes $C^6$ are formed in the bottom of each recess $C^5$. The suction holes for each recess $C^5$ are connected through a corresponding air passage $C^7$ in the folding cylinder and air pipe $C^8$ at the back of cylinder (right hand of Fig. 30 and Fig. 31) to the proper one of a set of air passages $C^9$ in the web $C^2$: each passage $C^9$ is provided with a port $C^{10}$ in the outer wall of the web. A stationary air box D (Figs. 24, 25, 30 and 31) supported on the shaft $B^6$ and held against rotation by the stud $d^1$ extending from the cam frame $g^{33}$ bears against the outer face of the web $C^2$ and is provided with an arc shaped slot or passage $D^1$ which extends about the shaft $B^6$ from a point adjacent the roll $E^2$ where the blank is received by the folding cylinder to a point adjacent the roll $f$ where the blank, after being folded, is removed from the folding cylinder. A port $D^2$ leading from the passage $D^1$ is connected by the coupling $D^3$ and flexible pipe $D^4$ through pipes $D^5$, $D^6$ and $D^7$ to the main exhaust pipe $D^8$ which is connected to some suitable exhauster not shown.

A valve $C^{12}$ in valve casing $C^{11}$ in each pipe $C^8$, shown in open position in Fig. 40 and in closed position in Fig. 41 controls connection between ports $C^6$ and air box D. These valves are normally open so that the ports $C^6$ for each folding bed are normally connected to exhaust through port $D^1$ except when moving from the blank discharging to the blank receiving positions. A cam lug $g^{37}$ carried by the stationary cam frame $g^{33}$ (Fig. 37) acting on the cam levers $C^{14}$ insures that each valve is always open as the corresponding folding bed moves into the blank receiving position. The cam lug $g^{37}$ is so located that it will engage the lever $C^{14}$ if the valve controlled by it is closed just prior to the movement of the corresponding folding bed into the blank receiving position. Each cam lever $C^{14}$ is connected to its valve $C^{12}$ by the valve stem $C^{13}$. Each lever $C^{14}$ is pivoted on studs $C^{15}$ carried by a bracket $g^{19}$ projecting from the corresponding bracket $g$ secured to the rear end of the folding cylinder.

Means are provided for closing each valve $C^{12}$ when its folding bed moves through the blank receiving position without receiving a blank. These means comprise a link $C^{16}$ having a back turned end $c^{16}$ movable through an opening in the bracket $g^{36}$ extending from the cam supporting spider $g^{35}$, into and out of position to engage the back side of the cam levers $C^{14}$ and move them to close their valves $C^{12}$. The lower end of the link $C^{16}$ is connected to a crank arm $C^{17}$ secured to the crank shaft $C^{18}$ (see Fig. 6). The crank shaft $C^{18}$ has secured to it bosses $C^{19}$ in which are held the reversely curved tell-tale guides $C^{20}$ which extend between the rolls E $E^1$ through grooves $e$ in the roll E. The outer portions of the guides $C^{20}$ adjacent the folding cylinder normally serve to deflect the blank fed between the rolls E, and $E^1$, into position to be gripped between the roll $E^1$ and the folding cylinder. In case a blank is not advanced by the rolls E and $E^1$ at the proper time, the guides $C^{20}$ are moved by the weight of the arm $C^{17}$ and parts attached to it into the angular grooves $e^1$ (see Fig. 38) formed to receive them in the periphery of the roll $E^1$. The resultant movement of the arm $C^{17}$ causes the link end $c^{16}$ to be moved into position to engage the corresponding cam lever $C^{14}$ and close its valve $C^{12}$. This prevents a leakage into the air passage $D^1$ from the ports $C^6$ of an empty folding bed and interference with the suction in folding beds which may be supplied with blanks.

The valve $C^{12}$, if closed, is thrown by the stationary lug $g^{37}$ to the open position when next the folding bed approaches the blank receiving position. An arm $C^{21}$ projecting from the shaft $C^{18}$ engages with a cam $C^{22}$ on the shaft $B^{10}$ which carries the roll E and insures that the tell-tale guides $C^{20}$ are held out of the grooves $e^1$ at the instant at which a blank should be passed between the rolls E and $E^1$. The cam lug $G^{37}$ comes into play only when a valve $C^{12}$ is closed, and valve $C^{12}$ is closed only when the corresponding folding bed moves away from the blank receiving position without receiving a blank. Normally each valve $C^{12}$ remains open continuously. The exhaust from the suction ports $C^6$ is cut off as the corresponding folding beds move from the blank discharge to the blank receiving position not by closure of the valve $C^{12}$ but because, as each folding bed is moved from the blank discharge to the blank receiving position, the corresponding port $C^{10}$ (Fig. 30) passes out of register with the port $D^1$ of the air box D. As shown, the port $D^1$ is arc shaped, extending about the shaft B through an angle in the neighborhood of three hundred degrees. The provisions for closing communication between the exhaust ports $C^6$ when these are not covered by bag blanks, and the main exhaust pipe prevents the fall of the vacuum in the exhaust pipe, or the increase in the load on the motor maintaining the vacuum, which would otherwise occur from air passing into the pipe through the open ports $C^6$.

In front of the recess $C^5$ of each folding bed are located a set of suction ports $C^{23}$. Each set communicates through its passage $C^{24}$ in the folding cylinder and air pipe $C^{25}$ with one of a set of air passages $C^{26}$ in the front web $C^2$. Leading from each air passage $C^{26}$ is a port $C^{27}$ which opens into the port $D^{10}$ of the air box $D^9$. The latter is supported by the shaft $B^6$ against the front web $C^2$ and held against rotation by the stationary stud $d^0$ attached to the stationary cam frame $G^{22}$. The port $D^{10}$ is connected by the air passage $D^{11}$, coupling $D^{12}$ and flexible tube $D^{13}$ to the pipe $D^{14}$ which in turn is connected by pipes $D^{15}$ $D^{16}$ $D^{17}$ to the main exhaust pipe $D^8$. The port $D^{10}$ is arranged relatively to the suction holes $C^{23}$ so that the suction holes $C^{23}$ of each folding bed are connected to exhaust to hold the lower ply of the flap end of the blank against the cylinder while the corresponding upper ply portion of the blank is being lifted by the roll F to permit the insertion in the tucked sides of the tubular blank of the wing folders $G^8$ $G^{53}$ $g^8$ $g^{53}$.

The roll F (see Figs. 45 and 46) has the same peripheral speed as the folding cylinder and is of a circumference double that of the peripheral distance between adjacent folding beds on the folding cylinder. It is provided with a pair of diametrically opposed sets of suction openings $F^2$, (see Figs. 21 to 27 inclusive) each set of ports being connected by a passage $F^3$ with the proper one of a pair of ports $F^5$. The ports $F^5$ are moved into communication at the proper time in the rotation of the roll F with the port $D^{19}$ of the air box $D^{18}$ which is supported on the shaft $B^3$ against the front end of the roll F and held against rotation by the pin $D^{24}$ carried by the bracket $D^{25}$ fastened to the framework A. The port $D^{19}$ is connected by the air passage $D^{20}$ and pipes $D^{21}$ and $D^{23}$ to the pipe $D^{15}$ connected to the main exhaust pipe $D^8$. The purpose of the roll F, as before stated, is to lift the upper ply of the flap end of the blank to permit the insertion of the wing folders $G^8$ $G^{53}$ $g^8$ $g^{53}$ into the tucked sides of the blank.

As the wing folders are inserted, connection between the corresponding ports $F^2$ and the exhaust pipe is broken by the movement of the port $F^5$ out of register with the port $D^{19}$. The operation of the roll F is illustrated by Figs. 45 and 46.

It may be here remarked that the roll $f$ which removes the blanks from the folding cylinder and is carried by the shaft $B^{31}$ is identical in construction with the roll F and is provided with ports, air box, etc. of the same character, the parts being designated by the letters $d$ and $f$ with the same exponents employed with letters D and F to designate similar parts.

To insure that the blanks are held in place against the folding cylinder while traveling from the roll $E^2$ to the roll F, guides $E^4$ are provided which are supported by the downwardly extending straps $E^5$ fastened to the framework A. The guides $E^4$ are each in the form of a crescent shaped plate, the plane of which is transverse to the axis of rotation of the folding cylinder C, and having its inner curved edge embracing the adjacent portion of the periphery of the folding cylinder C. The upper ends of these guides extend into grooves $F^1$ formed in the roll F and the lower ends of the guides into corresponding grooves $e^{10}$ formed in the bull-nose roll $E^2$ (see Fig. 44), the bull-nose $E^3$ being divided into three sections to clear the guides $E^4$.

The various devices for acting on the blanks as they are carried from the roll F to the discharge roll $f$ will now be described. Certain of these devices are carried by the folding cylinder and these are moved relatively to the folding cylinder in the proper manner through the instrumentality of cam frames $G^{22}$ and $g^{33}$. The frame $G^{22}$ surrounds the shaft $B^6$ at the front of the cylinder and is held in place by brackets $G^{23}$. Similarly the cam frame $g^{33}$ surrounds the shaft $B^6$ at the rear of the cylinder and is held in place by arms $g^{34}$ from a spider $g^{35}$ secured to the frame A.

To the front end of the cylinder are secured a set of brackets G one for each folding bed. A set of similar brackets $g$ are secured to the back end of the cylinder.

There are a set of folding devices, which I may call wings, for each folding bed. Each set includes a pair of wings $G^{53}$ $g^{53}$ which I may call holding down wings and a pair of wings $G^8$ $g^8$ which I may call turning back wings. The wings $G^8$ and $G^{53}$ are at the front end of the cylinder and the wings $g^8$ and $g^{53}$ are at the back end of the cylinder. The folding wings for each folding bed at the front side of the folding cylinder C are supported by the corresponding bracket G and the corresponding folding wings on the opposite side of the folding bed are supported by the opposing bracket $g$. Each of the two brackets G and $g$ for each folding bed has bearings $G^1$, $g^1$ supporting hollow shafts $G^2$ $g^2$, the common axis of which is approximately in alinement with the transverse cross fold line of the blank folded on the folding bed.

The holding down wings $G^{53}$ $g^{53}$ are carried by curved slides $G^{52}$ $g^{52}$ which slide in curved guideways formed in guides $G^{51}$ and $g^{51}$. Similarly the turning back wings $G^8$ and $g^8$ are carried by curved slides $G^7$ and $g^7$ which slide in curved guideways formed in the guides $G^6$ $g^6$. The slides $G^7$ and $g^7$ are connected by studs $G^9$ $g^9$ to extensions $G^{10}$ $g^{10}$ from disks $G^{11}$ $g^{11}$. Similarly the slides $G^{52}$ $g^{52}$ are connected by studs $G^{54}$ $g^{54}$ to parts $G^{55}$ $g^{55}$ extending from disks $G^{56}$ $g^{56}$. The disks $G^{56}$ and $G^{11}$ are slidingly supported by the hollow shaft $G^2$ and are moved on the shaft by means of plates $G^{12}$ which are connected at their inner ends by spacing blocks $G^{13}$. The plates $G^{12}$ are prevented from rotating on their shaft $G^2$ by a positioning shaft or pin $G^{24}$ secured to the plates and sliding into and out of an aperture formed for the purpose in the corresponding arm $C^1$. Similarly each pair of disks $g^{11}$ and $g^{56}$ are moved on their hollow shaft $g^2$ by means of plates $g^{12}$ spaced apart by separator $g^{13}$ and guided by a positioning shaft or pin $g^{24}$. Each separator $G^{13}$ has a lug carrying a pin or stud $G^{15}$ on which is mounted a block $G^{16}$ engaged by the forked end of lever $G^{17}$ pivoted on the stud $G^{18}$ supported by the bracket G of an adjacent folding bed through the bracket $G^{19}$.

The stud $G^{18}$ has attached to it the cam lever $G^{20}$ having a cam roll working in the cam path $G^{21}$ of the stationary cam frame $G^{22}$ at the front of the folding cylinder. A connecting rod $G^{37}$ connects the lever $G^{17}$ with the end $g^{20}$ of the lever $g^{17}$ pivoted on the stud $g^{18}$ supported by a bracket $g^{19}$ extending from the bracket $g$ of the corresponding folding bed. The lever $g^{17}$ is connected to the separator $g^{13}$ by stud $g^{15}$ and block $g^{16}$.

The movement of the cam roll on each lever $G^{20}$ in the cam pathway $G^{21}$ thus simultaneously moves the wing folders for one folding bed axially into and out of the positions in which they lie over the portion of the folding bed covered by the blanks.

Each of the hollow shafts $G^2$ $g^2$ has journaled in it a shaft $G^{46}$ $g^{46}$ provided at its inner end with a gear segment $G^{47}$ or $g^{47}$ and held against axial displacement by a nut $G^{48}$ or $g^{48}$ at its outer end. Each of the hollow shafts has at its inner end a gear segment $G^3$ or $g^3$. The guide $g^{51}$ is supported by a lug $g^{50}$ of an arm $g^{49}$ extending from the gear segment $g^{47}$. The guide $G^{51}$ is supported by a lug $G^5$ on the arm $G^4$ extending from the gear segment $G^3$. The guide $G^6$ is supported by a lug $G^{50}$ on an arm $G^{49}$ secured to the gear $G^{47}$. The guide $g^6$ is supported by a lug $g^5$ on an arm $g^4$ extending from the gear segment $g^3$.

The gear segment $G^3$ is actuated by a meshing gear segment on a lever $G^{38}$ attached to the shaft $G^{39}$ journaled in the webs $C^2$ of the cylinder. The shaft $G^{39}$ has secured to it a lever $g^{38}$ having a gear segment which actuates the gear segment $g^{47}$. The rotation of the shaft $G^{39}$ thus gives a small rotation to the holding down wings $G^{53}$ $g^{53}$ for a purpose hereinafter specified. A cam lever $g^{40}$ attached to the shaft $G^{39}$ and having a cam roll working in the cam path $g^{41}$ of the cam frame $g^{33}$ rotates the shaft $G^{39}$.

The turning back wings $G^8$ and $g^8$ are rotated about the common axis of shafts $G^2$ and $g^2$ in the following manner: The gear segment $g^3$ meshes with the gear segment carried by the lever $g^{42}$ attached to a shaft $G^{43}$ journaled in the web $C^2$. A lever $G^{42}$ attached to the shaft $G^{43}$ is provided with a gear segment actuating the gear segment $G^{47}$. The cam lever $G^{44}$ attached to the shaft $G^{43}$ has a cam roll working in the cam path $G^{45}$ of the stationary frame $G^{22}$.

The front tongue or holding finger $G^{25}$ is secured to the shaft $G^{24}$ (see Fig. 9) and hence moves axially into and out of the recess $C^5$ as the corresponding folding wings move into and out of the position in which they extend over the folding cylinder. The tongue or holding finger $g^{25}$, however, is axially movable independently of the folding wings as follows: Its hub, which is slidingly supported on the shaft $g^{24}$ has a lug $g^{26}$ (see Fig. 11) connected to the rod $g^{27}$ supported in the corresponding bracket $g$. The outer end of the rod $g^{27}$ has a hub $g^{28}$ (lower left hand corner of Fig. 8) from which extends a pin $g^{29}$ embraced by the fork end of lever $g^{30}$ pivoted on the stud $g^{18}$ and provided with an extension $g^{31}$ carrying a cam roll working in the cam path $g^{32}$ of the stationary cam frame $g^{33}$. As seen in Fig. 8, the tongues $G^{25}$ project by the inner ends of the corresponding folding wings and thus are able to enter the ends of the recesses $C^5$ and assist in holding the blanks in place before the latter are engaged by the corresponding folding wings. It will be understood that the tongue $G^{25}$ may be operated as is the tongue $g^{25}$. The operation of the folding wings on the bag blanks will be hereinafter described in detail.

While the upper ply of the flap end of the blank is being turned back by the turning back wings, as hereinafter described, the upper ply is engaged and supported by an arc shaped member H which is held against it, as shown in Figs. 47 and 48, for the purpose of preventing the overlapped edges $X^1$ of the blank, then imperfectly fastened together because the paste connecting them is still wet, from working back and forth on one another, scissors fashion. The member H is attached to a slide $H^2$ by a coupling device $H^1$. An eye piece $H^3$ extending from the coupling device $H^1$ is connected by rod $H^4$ to the end of a lever $H^5$ which is pivoted at $H^6$ to a bracket $H^{10}$ supported from the frame work of the machine. The lever $H^5$ carries a cam roll $H^7$ which works in the cam-way $H^8$ formed in the continuously rotating cam plate $H^9$. The slide $H^2$ has a slot or guideway formed in it in which is received the stationary stud $H^{12}$ supported by the bracket $H^{13}$. The guideway $H^{11}$ also slidingly receives a guide $H^{14}$ journaled on the pivot $H^{15}$ attached to the disk $H^9$. The mechanism described is arranged to give the proper rotative and sliding movement of the member $H^2$ relative to the fixed pivot $H^{12}$ to cause the member H to properly enter the mouth of each advancing bag and support the flap end of the upper ply as it is turned back about the primary transverse cross fold line, and then move out of the mouth of the blank back and into position to enter the mouth of the succeeding blank.

It will be understood that the member H is swung back and forth over the surface of the folding cylinder C by the mechanism described and that the motion of the member H is so timed that the member enters the mouth of the blank as the latter is being opened and engages the rear side of the pockets and bears against it through the final portion of the box forming operation, to gently support the rear side of the box and thus prevent the plies engaging it from working on one another which otherwise occur, inasmuch as the paste is still wet.

The mechanism for converting the box-like form into which the forward end of each blank is opened by the wing folders as shown in Fig. 48 into the flattened diamond shown in Fig. 50, is mounted on the shaft $B^{17}$. This mechanism comprises a pair of hubs $I^{18}$ $i^{18}$ secured to the shaft $B^{17}$ and each provided with three symmetrically disposed arms $I^{17}$ $i^{17}$. Each arm $I^{17}$ has journaled in its outer end, one end of a shaft $I^{16}$, the other end of which is journaled in the corresponding end of the arm $i^{17}$. On each shaft $I^{16}$ are mounted similar movable heads $I^{13}$ and $i^{13}$, against the flanged ends $I^2$ $i^2$ of which are secured members $I^1$ $i^1$ each of which has at its opposite end the curved flattening or folding plates I $i$. On the shaft $I^{16}$ between the moving heads is clamped a block-like member $I^7$. The round ends of shafts $I^4$ $i^4$ are journaled in diametrically opposed bosses $I^6$ $i^6$ formed on the block $I^7$. Between the bosses $i^6$ (Fig. 15) a crank arm $i^8$ is secured to the shaft $i^4$. A crank arm $I^8$ is secured in a similar manner to the shaft $I^4$. The arms $I^8$ $i^8$ are connected by links $I^9$ $i^9$ to flattening fingers $I^{10}$ $i^{10}$ pivotally secured at diametrically opposed points to the block $I^7$. The shafts $I^4$ $i^4$ are shown as square in cross section, the bars being twisted, however, so that the corner edges form in effect threads of low pitch. The square portions of the shafts $I^4$ $i^4$ pass through openings fitting them formed in the bosses $I^3$ $i^3$ of heads $I^{13}$ $i^{13}$, so that a movement of each pair of heads toward and away from the interposed block $I^7$ causes a rotation of the shafts $I^4$ $i^4$, which causes the fingers $I^{10}$ and $i^{10}$ to turn relatively to the block $I^7$. A guide shaft $I^{12}$ secured to the head $I^{13}$ slides in an opening formed to receive it in the block $I^7$, thus preventing angular movement of the head relative to the block. Similarly the pin shaft $i^{12}$ prevents angular movement between the block and the head $i^{13}$.

The heads $I^{13}$ $i^{13}$ each have pivotally secured to them trunnion collars or yokes $I^{14}$ $i^{14}$ provided with trunnions $I^{15}$ $i^{15}$ on which are journaled links $I^{22}$ $i^{22}$ pivoted to ends $I^{24}$ $i^{24}$ of levers $I^{25}$ $i^{25}$ by pins $I^{23}$ $i^{23}$. The levers $I^{25}$ $i^{25}$ are journaled on pins $I^{26}$ $i^{26}$ carried by studs $I^{27}$ $i^{27}$ secured to the arms $I^{11}$ $i^{17}$. The levers $I^{25}$ $i^{25}$ connected to the heads on the same shaft $I^{16}$ are connected by the link $I^{30}$. Each of the levers $I^{25}$ has secured to it between its ends a cam roll $I^{28}$ which works on the stationary cam $I^{29}$ surrounding the shaft $B^{17}$ to cause the flattening plates I $i$ to move toward and away from each other. The cam $I^{29}$ is secured on a sleeve portion of the adjacent bearing support $i^{21}$ for the shaft $B^{17}$. Each of the arms $I^{17}$ has journaled to it, and advantageously by means of the stud $I^{27}$, a spur gear $I^{20}$ which meshes with the stationary spur gear $I^{21}$, surrounding the shaft $B^{17}$ and secured to the bearing support $i^{21}$. Each spur gear $I^{20}$ meshes with a spur gear $I^{19}$ secured on the end of the adjacent shaft $I^{16}$.

The curved flattening blades I and $i$ have a radius of curvature substantially equal to the radius of the folding cylinder C and while working on the bag are moved so that the center of curvature of the operating blades remains in close proximity to the axis of rotation of the folding cylinder, and the axis of the folding cylinder, center of curvature of the flattening plates and primary transverse fold line all lie in the same plane. This result is obtained by the combination of the movement of the shafts $I^{16}$ about the axis of the shaft $B^{17}$ with the rotation in the opposite direction of the shafts $I^{16}$ about their own axes. With the particular mechanism disclosed, each shaft $I^{16}$ is given one and one half back turns while making one complete bodily rotation about the shaft $B^{17}$ and the latter shaft revolves twice as fast as the folding cylinder. As the flattener wings I and $i$ move from the full line position shown in Fig. 16 into their closest position relative to the folding cylinder and then away through the path indicated by the successive dotted line positions of the blades shown in Fig. 16, the heads $I^{13}$ $i^{13}$ are moved toward and away from the block $I^7$ from the full-line position shown in Fig. 17 through the successive positions shown in dotted lines back to the full line position.

As the blank is moved under the box flattening mechanism, the proper wings I $i$ which, remaining substantially parallel to the folding bed on which the blank is held, move toward one another and toward the folding bed as well as with the latter thus carrying the sides of the box into which one end of the blank has been opened, toward one another, and eventually flattening them down to form the diamond as shown in Fig. 50. After the box has been partially collapsed by the inturning of its sides, the front end of the box is engaged and knocked down by the flattening finger $I^{10}$ or $i^{10}$ which is turned relatively to the block $I^7$ by the rotation of the squared shaft on which it is supported.

The pasting devices, (see Figs. 1, 4, 5, 6 and 51) for applying the paste to the blank in two longitudinal lines $X^2$, comprise a pair of pasting segments J. The transverse paste line $X^3$ is applied by the pasting member $J^1$. The pasting devices J and $J^1$ are supported by the spider member $J^2$ mounted on the shaft $B^{14}$. In the construction shown there are two sets of pasting devices J and $J^1$, the two sets working alternately on the blanks. The pasting devices receive paste from a paste feed roll $J^3$ (see Figs. 4 and 5) which revolves with the same peripheral speed as the edges of the pasting devices. The shaft $J^4$ supporting the roll $J^3$ is journaled in bearings $J^5$ carried by the paste box $J^6$. The plate $J^7$ fastened to the paste box is adjusted against the paste roll to act as a scraper to regulate the thickness of the paste thereon and to prevent lumps of paste or solid foreign matter from being carried by the roll to the pasting devices. The paste box is provided with a lug $J^8$ which abuts against the latch-like member $J^{10}$, the latter being held in position by a bolt passing through the slotted opening $J^{11}$ in the latch. The pins $J^{12}$ projecting from the support $J^{13}$ are received in holes in the paste box $J^6$ to prevent displacement thereof in the direction parallel to the axis of the folding cylinder. By releasing the nuts clamping the latch $J^{10}$ in place, the paste box may be readily removed for cleaning and then be returned to the original position.

The mechanism for defining the lines at which the front and back flap portions of the diamond are folded to complete the formation of the square bag bottoms is carried by the shaft $B^{29}$ (see Figs. 1, 4, 5, 6, 18, 52 and 57). This mechanism includes a pair of spider members $K^1$ secured to the shaft $B^{29}$ and forming a support for the creasing blades. A pair of diametrically opposed front flap creasing blades K are adjustably secured to the members $K^1$ by bolts $K^2$. A block $K^{10}$ is secured to the shaft $B^{29}$ between the spiders. The member $K^{10}$ has journaled in it at opposite sides of the shaft $B^{29}$ a pair of shafts $K^9$ which are parallel to the shaft $B^{29}$.

Each of two pairs of blocks $K^7$, one pair on each shaft $K^9$ have adjustably secured to them a back flap creasing blade $K^6$, the body of which, as shown in Fig. 6 is not radial, but has its outer portion inclined away from the corresponding front flap creasing blade K. The crank arms $K^{15}$ secured to the front ends of the shafts $K^9$ have pins $K^{16}$ eccentrically disposed with reference to the shaft $K^9$ which are connected by means of springs $K^{17}$ to pins $K^5$ secured to arms $K^4$ formed on the front spider member $K^1$. These springs tend to move each blade $K^6$ toward the adjacent blade K. The back ends of the shafts $K^9$ carry crank arms $K^{11}$ having cam rolls $K^{12}$ which travel against the inner surface of the stationary cam member $K^{13}$ (see Fig. 18). When each blade $K^6$ is at the limit of its movement away from the adjacent blade K (position of the blade $K^6$ adjacent the folding cylinder in Fig. 6) the blade is supported as shown in Fig. 6 by the block $K^{10}$.

It will be understood that the springs $K^{17}$ hold the cam rolls $K^{12}$ against the cam flange $K^{13}$ and that when either cam roll engages with a projection of the cam surface toward the shaft $B^{29}$ the corresponding blade $K^6$ is moved away from the adjacent blade K. The cam $K^{13}$ is supported on the shaft $B^{29}$ and is adjustably secured in place by means of the bolt $k^{14}$ passing through the slotted hole in the bracket $K^{14}$ attached to the framework of the machine. The folding cylinder has formed in the surface of each folding bed two axially extending grooves receiving rubber, or the like, creasing pads $C^{28}$ (see Figs. 8, 16, 44, etc.); two of these creasing pads being provided for each folding bed, one coöperating with the front flap creasing blade and the other with the back flap creasing blade.

It will be understood that the two pairs of blades K and $K^6$ are duplicates, the pairs working alternately on the blanks advanced by the folding cylinder.

After the flap creases are formed, the back flap is first turned forward down onto the bottom of the blank and then the front flap is turned back onto the back flap. The bent form of the back flap creasing blades $K^6$ is an advantage in permitting the blades to get quickly out of the way of the means for turning the back flap forward.

The means for turning the back flap forward after the flap creases are formed comprises a pair of wiping fingers L $l$ for each folding bed, which sweep over the periphery of the cylinder. Each wiper is connected by a portion extending substantially parallel to the end of the cylinder to a crank arm $L^1$ which is journaled on a substantially radial stud $L^2$ supported on a bracket $L^3$ attached to the corresponding bracket G. The stud $L^2$ has attached to it the bevel-gear segment $L^4$ (see Fig. 42) actuated by the gear segment $L^5$ attached to lever $L^6$. The lever $L^6$ is attached to the shaft $L^7$ journaled in the web $C^2$ of the cylinder. A cam lever $L^8$ attached to the shaft $L^7$ carries a stud $L^9$ on which is journaled a cam roll $L^{10}$ working in the cam path $L^{11}$ of the cam frame $G^{22}$. Each wiper $l$ is supported and constructed like the wiper L and is operated in a similar manner by a lever $l^6$ secured to the shaft $L^7$.

Each front blank flap is lifted from its folding bed after the front flap crease is formed by fingers $m$ and M carried by and as shown forming integral extensions of arms $m^1$ $M^1$ attached to shaft $M^2$, journaled in the arms $C^1$. When in operation each of the flap lifter arms $M^1$ or $m^1$ and its extension or finger M or $m$, respectively, is located below the face of the folding bed, the finger M or $m$ then being received in a corresponding pocket or opening $C^{29}$ formed for the purpose in the cylinder C. Each arm $M^1$ has an extension $M^3$ provided with a studding $M^4$ supporting a block $M^5$ received between the forked ends $M^6$ of a cam lever $M^7$. The cam levers $M^7$ are attached to shafts $M^8$ journaled in the webs $C^2$. A cam lever $M^9$ attached to each shaft $M^8$ has a stud $M^{10}$ supporting a cam roll $M^{11}$ working in the cam path $M^{12}$ of the cam frame $g^{33}$. The bent strap front flap holder N is supported by a strip $N^1$ attached to angle brackets $N^2$ attached to the side frames A.

In considering the operation of the machine, the following points should be borne in mind: The in-and-out movement of all the folding wings and the tongue or finger $G^{25}$ appurtenant to each folding bed are produced by the travel of the cam roll carried by the corresponding lever $G^{20}$ in the cam path $G^{21}$ of the stationary cam frame $G^{22}$. The in-and-out movement of each tongue or finger $g^{25}$ is produced by the movement of the cam rolls on the arms $g^{31}$ in the cam path $g^{32}$ of the cam frame $g^{33}$. The rotation of each pair of front holding wings $G^{53}$ $g^{53}$ is produced by the movement of the cam roll on the corresponding cam lever $g^{40}$ in the cam path $G^{41}$. The rotation of the turning back wings $G^{8}$ $g^{8}$ is produced by the movement of the cam rolls on the cam levers $G^{44}$ working in the cam path $G^{45}$ of the cam frame $G^{22}$. The movement of each set of back flap folding devices is produced by the movement of the corresponding cam roll $L^{10}$ in the cam path $L^{11}$ of the cam frame $G^{22}$ and the movement of the front flap lifting devices M and $m$ is produced by the movement of the cam rolls $M^{11}$ in the cam path $M^{12}$ of the cam frame $g^{33}$. It will also be understood that the various cam paths are so shaped and arranged as to cause the various instrumentalities carried by the folding cylinder and appurtenant to each folding bed to have the movements described below with reference to the devices coacting with the particular folding bed supporting the blank, the progress of which is followed through the machine.

The progress of one blank through the machine from the blank receiving to the blank discharging positions is as follows: Bag blanks are fed to the continuously revolving folding cylinder so that in normal operation the bull-nose $E^{3}$ depresses a blank into the recess $C^{5}$ of each folding bed as the folding beds pass the roll $E^{2}$. As the bull-nose $E^{3}$ moves through the position in which it lies between the centers of the shafts $B^{6}$ and $B^{12}$ the turning back folding wings $G^{8}$ and $g^{8}$ of the folding bed, which have been turned through an angle of approximately 180° away from the holding down or front folding wings, start to turn toward the latter and, at the same time, start to move in toward the folding cylinder, the inward movement being continued until the finger $G^{25}$ has entered the depression $C^{5}$ at the end of the bull-nose and over the paper. At the same time the independently movable finger $g^{25}$ is moved into the recess $C^{5}$ of the paper at the opposite end of the bull-nose. The initial inward movement of the fingers $G^{25}$ $g^{25}$ is rapid and takes place practically before the bull nose starts to move away from the bottom of the recess $C^{5}$. At the same time the proper port $C^{10}$ is brought into register with the elongated port $D^{1}$.

As the folding cylinder advances the bag blank, the corresponding back wings turn forward into substantial parallelism with the front wings and the finger $g^{25}$ reaches the inward limit of its movement, both of the actions just mentioned occurring before the blank has been carried into position to be operated upon by the roll F. When the forward end of each blank passes under the roll F, the movement of the latter relative to the air box $D^{9}$ connects the proper suction holes $F^{2}$ to exhaust and thus secures the upper ply of the blank to the roll F. At the same time the proper suction holes $C^{23}$ are connected to exhaust, thus securing the flap end of the lower ply of the blank to the folding bed. The relative movements of the folding cylinder and the roll F then cause the flap end of the upper ply to be lifted as shown in Fig. 45. As the end of the blank thus opens, its wing folders are moved into the tucked sides of the blank as shown in Fig. 45. The ports $F^{2}$ and $C^{23}$ are disconnected from the exhaust pipe at or shortly after the time when the blank is opened to the extent shown in Fig. 45, at which time the wing folders have entered. As the blank thereafter advances, the wing folders are moved in to the inner limit of their movement and then start to rotate in opposite directions; the front wings in the direction to carry them from the tangential position down relative to the folding cylinder in which they enter the blank onto the lower ply of the blank, and the back wings back through an angle of a little more than 180°, thus carrying the end of the blank from the position shown in Fig. 46 through the position shown in Fig. 47 into that shown in Fig. 48. While the upper ply is being turned from the position shown in Fig. 47 to form the box of Fig. 48, the seam holder H bears against the upper ply of the blank to prevent the overlapping tube edges $X^{1}$ from working on each other, after which it moves out of the blank and back into position to enter the blank carried on the following folding bed.

The blank is next operated upon with the wing folders stationary and in the position shown in Fig. 48 by the flattening mechanism. The operation of the latter has already been fully described. As the flattener blades move away from the cylinder, the holding down wings $G^{53}$ $g^{53}$ and the turning back wings $G^{8}$ $g^{8}$ are rotated away from the surface of the folding cylinder C sufficiently to bring them into the tangential relation with respect to the cylinder C and are then withdrawn, after which they are further rotated away from the surface of the folding cylinder and are then moved back over the edges of the diamond and are rotated toward the surface of the folding cylinder to carry them down into engagement with the bag.

This rotation need not be completed, however, until the completion of the pasting operation.

It should be remarked that the folding wings do not have the edges of their blank engaging portions most remote from their axis of rotation at an angle of 45° to their axes of rotation as is usual. On the contrary these edges are shaped to make the ends of the wings somewhat more obtuse and so that as the wings are withdrawn from the triangular pockets formed in the bottom of the bag by the operation of the wings in opening the blank, the movement of the curved wing slides in their curved guides is such that the edges of the wings travel in proximity to the outer corners of the pockets until they are moved out of engagement with the blank. Consequently when wings again engage the blank, this time on the upper side of the diamond, they engage it practically at the corners of the square of the bottom. As the blank passes under the pasting mechanism, the lines of paste $X^2$ and $X^3$ are applied as has been described, and the blank then passes to the flap fold creasing mechanism. As the creasing blades press the paper into the creasing pads $C^{28}$, the front and back flaps tend to lift until they extend practically radially. As the creasing blade K starts to move from the paper, the flap lifter, arm extensions, or fingers M m start to move outward through the apertures $C^{29}$ and into the position shown in Fig. 53 in which the front flap is held at an angle somewhat back from the radial plane passing through the front flap crease, the movement of the fingers M m being of course so timed as to clear the blade K. Each blade $K^6$ when forming a crease is held at the limit of its turning movement away from the corresponding blade K by the cam roll 12 and cam 13. The edge of the blade $K^6$ is then approximately in the plane including the centers of the shafts $B^{29}$ and $K^9$. Immediately after the formation of the back flap crease, the cam $K^{13}$ and cam roll $K^{12}$ allow the blade $K^6$ to be turned under the action of its spring $K^{17}$ rapidly toward the blade K, so that the wipers L and l, which have moved up behind the back flap as the latter lifts during the creasing operation to the position shown in Fig. 6 may engage the back flap and fold it down as shown in Fig. 54. The blank is then carried under the strap folder N which presses the front flap back on the bottom of the bag and on top of the forward edge of the back flap, thus completing the folding operation. The sliding finger $G^{25}$ then begins to move axially out of the recess $C^{25}$ and the folding wings first move into the tangential relation to clear the bag and are then withdrawn, the folding wings and tongue $g^{25}$ as well as finger $G^{25}$ being entirely withdrawn at the time the blank reaches the cylinder $f$ and by this time also the wipers L l have been swung out of their normal position at the sides of the folding cylinder.

As the bag passes under the roll $f$ the appropriate ports $f^2$ are connected to exhaust, thus securing the forward end of the bag to the roll and insuring that it is properly entered between the roll and the curved guides $E^6$ which enter the grooves $C^4$ in the cylinder C and deflect the blank away from the cylinder. This concludes the operation of the mechanism hereinbefore described on the blank. It will, of course, be understood that as a bag is being removed from the folding bed by the roll $f$, a bag blank is being fed to the preceding folding bed by the roll $E^1$, and that blanks on the remaining folding beds are undergoing various portions of the folding operation hereinbefore described with reference to the particular blank which has been followed through the machine.

It will be observed that each pair of fingers or holding devices $G^{25}$ $g^{25}$ for the upper ply of the blank are separated from the walls of the corresponding recess $C^5$ by a space appreciably greater than the thickness of the blank. As a result, while the lower ply of each blank is held firmly against its folding bed by the suction in the holes $C^6$ and the upper ply is held against undue movement by the fingers $G^{25}$ $g^{25}$, the blank has a certain freedom to adjust itself to permit the folding operations to be carried out with an avoidance of disruptive strains in the blank material.

The various elements and combinations of the machine described are peculiarly adapted for conjoint action upon successive bag blanks in a very rapid and accurate manner. The various steps in the manipulation of the blanks are so taken and carried out that the folds are formed in an easy and natural manner, highly conducive to the production of accurately formed bags of uniform quality at high speed and with very small waste.

Those skilled in the art will readily understand that changes may be made in the form of my invention without departing from its spirit, and particularly, certain features of my invention may advantageously be employed under certain circumstances without a corresponding use of other features.

Having now described my invention, what I claim as new and desire to secure by Letters Patent is—

1. In a bag machine, a blank support having a folding bed, a pair of folding wing supports at each side of the folding bed mounted to turn relatively thereto about an axis transverse to the length of the folding bed, a folding wing mounted on each support to move with respect thereto toward and away from the bed through a curved path concave toward said axis, means for rotating the supports about their axis, and means for moving the wing folders relative to their supports.

2. In a bag machine, mechanism for forming bottoms on bellows sided bag blanks, including a blank support, means for holding a blank thereon, turning back wings movable into and out of the side tucks of the blank, means for operating said wings when inserted in the side tucks to open the end of the blank and thereby form triangular side pockets in the bag bottom, and means for thereafter withdrawing the said wings through a path such that their tips are in proximity to the rear outer corners of said side pockets at the end of the withdrawing operation.

3. In a bag machine, mechanism for forming diamond folds on bellows sided blanks, including in combination a blank support, means for holding a blank thereon, turning back wings on opposite sides of the blank support, supports for the wings hinged to turn about a common axis, means for turning the wings about said axis, and means for moving each of said wings relative to its support through a curved path concave toward said axis to move the wings into and out of the side tucks of the blank, said path being of such a character that as each wing is withdrawn from the corresponding triangular pocket formed in the sides of the bag bottom it moves in proximity to one of the outer corners of said pocket.

4. In a machine for forming bottoms on bellows sided bag blanks, a blank support, a pair of folding wing supports pivotally supported at each side of the blank support to turn relatively thereto about an axis adjacent the primary transverse crease line of the blank, each support having mounted thereon a folding wing movable relatively to the support through a path concave toward said axis, means for rotating each folding wing support about said axis and means for moving the folding wings relatively to said folding wing supports.

5. In a bag machine, mechanism for forming bottoms on tubular bag blanks, including a blank support provided with a folding bed, a pair of holding wings and a pair of turning back wings arranged one holding wing and one turning back wing at each side of the folding bed, shafts supporting said wings and extending transversely to the folding bed, mechanism for moving the two wings at one side of the folding bed toward and away from the other two wings, mechanism for turning the holding wings about the axes of their supporting shafts, and separate mechanism for turning the turning back wings about the same axes.

6. In a bag machine, mechanism for forming bottoms on bellows sided bag blanks, including a blank support, means for holding a blank thereon, folding wings, means for moving them into and out of the side tucks of the blank, means for operating said wings while inserted in the side tucks to open the end of the blank and thereby form triangular side pockets in the blank bottom, and means for separating the wings in each pocket as they are withdrawn so that the edges of the wings travel in proximity to the outer corners of the side pockets throughout the withdrawing operation.

7. In a bag machine, mechanism for forming bottoms on bellows sided bag blanks, including a blank support having a folding bed, means for holding a blank on said bed, folding wings movable into and out of positions in which they extend over said bed, mechanism for operating the wings while inserted in the side tucks of the blank to open the end of the blank, mechanism for working on the blank after its end is opened, and mechanism for moving said wings over the bed and into the side tucks of the blank prior to the opening of the blank end, moving them out of the blank after the end is opened and for moving them back over the blank to hold it during subsequent operations.

8. In a machine for forming bottoms on bellows sided bag tubes, the combination with a blank support of flap folding mechanism and diamond folding mechanism, said diamond folding mechanism including a pair of wings movable into each side tuck of the blank to open the end of the blank, out of the side tucks, and then back onto the bottom to hold it in place during the flap folding operation, means for so moving the wings, and means for operating the wings in the side tucks to open the diamond.

9. In a bag machine, a blank carrier and box forming, box flattening, and flap folding mechanisms coöperating successively therewith, the box forming mechanism including folding devices and means for moving said devices into the side tucks of the blank at the beginning of the box forming operation, withdrawing them at the conclusion of the box flattening operation and moving them onto the edges of the folded bottom prior to the flap folding operation.

10. In a bag machine, mechanism for forming bottoms on bellows sided bag blanks, including a blank support, means for holding a blank thereon, and holding down and turning back folding wings movable into and out of the position in which they extend over the portion of the blank support covered by the blank, means for moving the turning back folding wings relatively to the holding down wings to open the end of the blank, means for moving the blank engaging portion of each wing toward and away from the primary transverse crease line of the blank as the wings are moved into and out of said position, and means for moving the wings into the side tucks of the blank, withdrawing them after the end of the blank is opened, and thereafter moving them back onto the bottom.

11. In a bag machine, a blank support having a folding bed, means for securing a blank thereon, folding wings for each side of the blank movable into and out of the position in which they lie over the portion of the folding bed covered by the blank, means for causing the blank engaging ends of the wings to approach and separate from the primary transverse crease line of the blank as the wings move into and out of said position, means for lifting the upper ply of the blank to facilitate the entrance of the folding wings into the side tucks of the blank, means for thereafter operating the wings to open the end of the blank into a box, means for flattening the box while the wings are in place, means for flap folding the blank, and means for moving the wings into said tucks at the beginning of the folding operation, out of said tucks at the end of the flattening operation and back onto the edges of the blank prior to the flap folding operation.

12. In a bag machine for diamond and flap folding a bellows sided bag blank, a blank carrier, means for securing a blank thereto, a pair of folding wings movable into each side tuck of the blank, means for rotating one wing of each pair relatively to the other to open the end of the blank into a box, means for spreading the wings of each pair apart as they are withdrawn, means for flattening the box into the diamond, means for flap folding the ends of the diamond, and means for moving the wings into the side tucks at the beginning of the folding operation, withdrawing them after the formation of the box, and moving them back onto the edges of the blank after the completion of the diamond folding operation, and prior to the flap folding operation.

13. In a bag machine, mechanism for forming bottoms on bellows sided blanks, including in combination a blank support having a folding bed, means for securing a bag blank thereto, a holding down wing and a turning back wing at each side of the blank support, movable into and out of the position in which they lie over portions of the folding bed covered by the blank, means for lifting the flap end of the upper ply of the blank to permit the folding wings to be moved into the side tucks of the blank, means for operating the wings to open the end of the blank while inserted in the side tucks, flap folding mechanism, and means for moving the wings into the tucks at the beginning of the bottom forming operation, withdrawing them at the end of the diamond folding operation and moving them back onto the edges of the diamond folded blank prior to the flap folding operation.

14. In a bag machine, mechanism for forming bottoms on bellows sided bag blanks including in combination a traveling blank support provided with a folding bed, turning back wings on opposite sides of blank support, operating mechanism for moving said wings into and out of the side tucks of a blank and for moving said wings to turn back the upper ply of the blank, and mechanism for separating the flap ends of the upper and lower plies of the blank comprising means acting on the flap end of the upper ply to lift it from the support and means acting on the flap end of the lower ply to hold it from rising from the bed, said means and operating mechanism being so relatively timed that said flap ends are operatively acted upon and separated while said wings are being moved into the said side tucks and are then left free during the major portion of the turning back operation.

15. In a bag machine mechanism for forming bottoms on bellows sided bag blanks, including in combination a traveling blank support provided with a folding bed portion, turning back wings carried by said blank support, operating mechanism for moving said wings into and out of the side tucks of a blank and for moving the side wings to turn back the upper ply of the blank and mechanism for preliminarily separating the flap ends of the upper and lower plies of the blank comprising a roll above the folding bed provided with suction ports adapted to be covered by the flap end of the upper blank whereby said ply is lifted from said bed, said bed being provided with suction ports adapted to be covered by the flap ends of the lower blank ply, suction apparatus, and means for intermittently connecting and disconnecting said ports to said suction apparatus, said last mentioned means and said operating mechanism being so relatively timed that the plies are operatively acted upon by said ports and the plies separated while said wings are being moved into the side tucks and are then left free during the major portion of the turning back operation.

16. In a machine for forming bottoms on tubular bag blanks, a rotating folding cylinder provided with a plurality of folding beds, each folding bed having a suction port or ports closed by the blank on the folding bed, an air passage leading from the suction ports of each folding bed, a main exhaust pipe, means connecting each air passage to the main exhaust pipe as the corresponding folding bed moves from the blank receiving toward the blank discharging position, a normally open valve in each passage between the suction port or ports and the connection to the main exhaust pipe, means for feeding a blank to each folding bed as it moves through the blank receiving position, and means for closing each valve when the corresponding folding bed moves through the blank receiving position without receiving a blank.

17. In a bag machine, in combination with a traveling blank support, means for securing the body of a bag blank thereon, holding down and turning back wings carried by the support, means for lifting the flap end of the upper ply of the blank to permit the wings to be moved into the side tucks thereof, comprising a rotating roll having suction ports formed in its surface covered by the flap end of the upper ply of the blank, said blank support being provided with suction ports covered by the lower ply of the flap end of the blank prior to the folding, and means for creating a suction in said ports in the roll and the blank carrier while the folding devices are being moved into the side tucks of the blank, and means for moving the folding devices into said side tucks.

18. In a bag machine, a rotating cylinder provided with a plurality of folding beds, each of which has a suction hole adapted to be closed by a blank on the bed, a separate air passage leading from the suction hole of each bed to a port, a stationary air box having a port communicating with each of the air passage ports as the corresponding folding bed moves from the blank receiving positions into proximity with the blank discharging position, means for feeding a blank to each folding bed as it moves through the blank receiving position, a normally open valve in each passage between the suction opening and port, means for closing each valve upon a failure of the corresponding folding bed to receive a blank as it moves through the blank receiving position, and means for opening each valve which may be closed as its corresponding folding bed moves from the blank discharging position into the blank receiving position.

19. In a machine for forming bottoms on tubular bag blanks, a blank support, means normally delivering a bag blank thereto at regular intervals, pneumatic holding means for securing each blank so delivered to the support, and means automatically actuated by the failure of the blank delivering means to deliver a blank for preventing the operation of said holding means.

20. In a machine for forming bottoms on tubular bag blanks, a blank support, means normally operating to deliver a bag blank to the support at regular intervals, said blank support being provided with suction openings covered by the blanks delivered to it, means normally acting to exhaust air from said openings as the blanks are delivered, and means actuated by a failure of the blank delivery means to supply a blank to the support for preventing the exhaustion of air in said openings.

21. In a machine for forming bottoms on tubular bag blanks, a traveling blank support, a roll for feeding blanks to said support and having a groove formed in its blank engaging surface, pneumatic holding means for securing each blank to the support, and mechanism for rendering said means inoperative, comprising a finger tending to move into said groove but normally held out of said groove by the blanks advanced by the roll.

22. In a machine for forming bottoms on tubular bag blanks, a traveling blank support, a roll for feeding blanks to said support and having a groove formed in its blank engaging surface, pneumatic holding means for securing each blank to the support, mechanism for rendering said means inoperative, comprising a finger or fingers tending to move into, but normally held out of said grooves by the blanks advanced by the roll, and means insuring the withdrawal from the groove of the finger in time to permit the initial advancement by the roll of a succeeding blank.

23. In a machine for forming bag bottoms, a folding bed provided with a depression, a member for forcing a portion of a bag blank into said depression, actuating means for said member, said member being shorter than the width of the blank, and means for securing the portion so entered as the member moves out of the depression, said means including a finger moved into said depression over the blank at one end of the member.

24. In a machine for forming bag bottoms, a folding bed provided with a depression, a member for forcing a portion of a bag blank into said depression, actuating means for said member, and means for securing the portion so entered as the member moves out of the depression, said means including openings formed in the bottom wall of the depression and means for exhausting air from said openings.

25. In a machine for forming bag bottoms, a rotary folding cylinder provided with a folding bed having a transverse depression formed therein, a roll having its axis parallel with said folding cylinder and provided with a projection adapted to enter the depression in the folding cylinder as the two rolls are rotated in opposite directions to thereby force a portion of a bag blank into said depression, means for rotating the rolls, and means for securing the blank portion forced into said depression by said projection, said means including fingers movable axially into said depression over the depressed portion of the blank.

26. In a bag machine, a support for a blank, provided with a depression on its blank engaging surface extending transversely to the length of the blank, openings in the bottom of said depression, means for exhausting the air from said openings to thereby secure the lower ply of the bag blank against the bottom of said depression and a blank holding device movable into said depression above the blank but separated from the depression by a space appreciably greater than the thickness of the bag blank.

27. In a bag machine, mechanism for diamond folding a tubular bag blank, comprising a blank support provided with a series of openings in its surface, means for placing a bag blank on the support with the openings adjacent but back of the primary transverse crease line of the blank, means for exhausting air from said openings, and holding means engaging the upper ply of the blank above said openings but separated from the blank support by a distance greater than the thickness of the blank, whereby the upper ply of the blank is held in place without clamping it against the blank support.

28. In a bag bottoming machine, a blank support, means for firmly securing the bottom ply of the blank to the blank support along the line adjacent to the primary transverse crease line of the blank, and means engaging the upper ply of the blank above the first mentioned line, to hold said upper ply in position, said means being separated from the blank support by a space greater than the thickness of the blank, whereby the upper ply of the blank is held in place without being clamped against the blank support.

29. In a bag machine, a rotating blank support, means for securing a bag blank thereon, means for opening the end of the bag blank, and means for flattening the opened blank end including a shaft, one or more curved flattening blades supported thereby, means for revolving the shaft in a direction opposite to the direction of rotation of the blank support about an axis laterally displaced from the shaft axis, and means for rotating the shaft about its own axis in the same direction as the blank support rotates.

30. In a bag machine, a folding bed, means for securing a bag blank thereon, a pair of flattening plates and means for moving said flattening plates toward each other and toward the folding bed while maintaining the plates in substantial parallelism with the folding bed.

31. In a bag machine, a rotating cylindrical blank support, means for securing a bag blank thereon, means for opening one end of the blank, and mechanism for flattening the opened end of the blank, comprising a pair of curved flattening plates having a radius of curvature approximately equal to that of the blank support, and means for moving the folding plates toward each other and toward the blank support and angularly with the latter while maintaining the center of curvature of the plates in close proximity to the axis of rotation of the support.

32. In a bag machine, a blank support, means for securing a blank thereto, means for opening the end of the blank, and mechanism for flattening the opened end of the blank, including a pair of flattening plates, and means for simultaneously moving the flattening plates toward each other and toward the said support, while maintaining the blades in substantial parallelism with the surface of the blank.

33. In a bag machine, a rotating folding cylinder, means for securing a bag blank thereto, means for opening the end of the bag blank, and mechanism supported independently of the folding cylinder for flattening the opened end including a pair of flattening plates concave toward the folding cylinder, and means for moving said plates angularly with the folding cylinder while at the same time causing them to approach each other and the cylinder.

34. In a bag machine, a folding cylinder rotating about an axis, a shaft at one side of the folding cylinder and extending parallel to the axis thereof, arms secured to the shaft, a second shaft journaled in said arms, folding blades supported by the second shaft and non-rotatable with respect thereto, and means for rotating said second shaft in the same direction as, and the first mentioned shaft in a direction opposite to, the direction of rotation of the folding cylinder.

35. In a bag machine, a folding cylinder rotating about an axis, a shaft at one side of the folding cylinder and extending parallel to the axis thereof, arms secured to the shaft, a second shaft journaled in said arms, folding blades supported by the second shaft and non-rotatable with respect thereto, and means for rotating the second shaft in the same direction as, and the first mentioned shaft in a direction opposite to the direction of rotation of the folding cylinder, and means for moving said blades toward and away from each other on their supporting shaft as they approach and move away from the folding cylinder.

36. In a bag machine, a folding bed, means for securing a bag blank thereto, means for opening the end of the blank and flattening mechanism coöperating therewith, comprising a pair of flattening plates movable toward each other during the flattening operation to engage and turn in the sides of the opened blank end, a finger located between the flattening plates for engaging and knocking down the front portion of the open end of the box, operating means for the finger actuated by the to and fro movement of the plates, and means for moving the plates toward and away from one another.

37. In combination a blank support, means for opening one end of a bag blank thereon, and means for flattening one end of the bag blank, comprising a support, a pair of flattening members slidingly mounted thereon to have a relatively to and fro movement, a flattening finger pivotally connected to the support, a shaft fastened to the finger and connections between said shaft and one of said members, so that the to and fro movement of said member rotates said shaft and turns the finger relative to said support, and means for giving a to and fro movement to said members.

38. In a bag machine, a movable blank support, a rotating creasing blade support, a front flap creasing blade rigidly secured to said support, a back flap creasing blade hinged to said support, and means for moving the back flap creasing blade at the conclusion of its creasing operation rapidly toward the front flap creasing blade.

39. In a bag machine, the combination with the movable folding cylinder, of the rotating creasing blade support $K^{10}$, the bent creasing blade $K^6$ pivotally connected thereto, and means for turning the creasing blade forward on its support at the conclusion of its creasing operation.

40. In a bag machine, a movable blank support, a creasing blade support, a creasing blade pivotally supported on said support to oscillate with respect thereto, means arranged to hold the blade stationary with regard to the support during the creasing operation, means for rotating the support with a speed which carries the edge of the creasing blade at the same speed as the blank carrier during the creasing operation, and means for turning said blade relative to its support at the conclusion of the creasing operation to rapidly clear the blank.

41. In a bag machine, a continuously rotating blank support, a shaft located without the blank support, a second shaft pivotally supported by the first mentioned shaft and having its axis laterally displaced from that of the first mentioned shaft, a creasing blade secured to said second shaft, mechanism acting on said second shaft to oscillate it in its bearings and arranged to hold the blade stationary with respect to the first mentioned shaft during the creasing operation, and to thereafter turn the blade forward with respect to the first mentioned shaft and means for continuously rotating the first mentioned shaft with a speed which carries the edge of the creasing blade at the same speed as the blank support during the creasing operation.

42. In a bag machine, the combination with a movable folding cylinder of the rotating creasing blade supporting shaft $B^{29}$, the front flap creasing blade K rigidly secured thereto, the shaft $K^9$ laterally displaced from the shaft $B^{29}$, pivotally supported by the latter, and having the cam engaging arm $K^{11}$, and the back flap creasing blade secured on the shaft $K^9$.

43. In a bag machine, the combination with a movable folding cylinder, of the rotating creasing blade supporting shaft $B^{29}$, the front flap creasing blade K rigidly secured thereto, the shaft $K^9$ laterally displaced from the shaft $B^{29}$, pivotally supported by the latter and having the cam arm $K^{11}$, and the backwardly inclined back flap creasing blade $K^6$ secured to the shaft $K^9$.

44. In a bag machine, a blank support, means for holding a diamond folded blank thereon, means movably supported on the blank support for lifting the front flap of the diamond folded blank from the blank support, and means for engaging the lifted up flap to fold it back.

45. In a bag machine, a folding cylinder, and flap fold creasing mechanism including creasing blades K and $K^1$, front flap lifters M, m, front flap folder N and back flap wiping folders L l.

46. In a bag machine, a blank support, means for securing a tubular blank thereon with its longitudinal seam uppermost, means for engaging and turning back the upper ply of one end of the blank to form the diamond folds, a seam holder, and means for moving it into the blank at said end and holding it in engagement with the upper ply of the blank during the turning back operation.

47. In a bag machine, a continuously rotating blank support, means for securing a tubular blank thereon with its longitudinal seam uppermost, means for engaging and turning back the upper ply of the blank at one end to form the diamond folds, a seam holder supported independently of the blank support and means for moving it into the blank at said end and holding it in engagement with the upper ply during the turning back operation.

48. In a bag machine, mechanism for diamond folding a bellows sided bag blank including a blank support, means for securing a blank thereon, turning wings movable into and out of the side tucks of the blank and operable to turn back the upper ply of the blank about the primary transverse crease line and form the triangular side pockets in the bottom of the bag, each wing being so disposed that the edge remote from said crease line of each wing portion entering the side tucks makes an angle with said crease line greater than 45° whereby said edges clear the sides of said pockets except at the outer corners thereof, and mechanism for moving and operating said wings.

49. In a bag machine, mechanism for the diamond folding a bellows sided bag blank, including a blank support, means for securing a blank thereon, turning wings movable into and out of the side tucks of the blank and operable to turn back the upper ply of the blank about the primary transverse crease line and form the triangular side pockets in the bottom of the bag, each wing being so disposed that the edge remote from said crease line of each wing portion entering the side tucks makes an angle with said crease line greater than 45° whereby said edges clear the sides of said pockets except at the outer corners thereof, and mechanism for moving and operating said wings, including means for moving said wing portions away from said crease line as the wings are withdrawn from said pockets.

50. In a paper-bag machine, the combination of a folding bed, means for holding a bag-blank thereon, means for forming the diamond fold on the bag-blank, a lifter arm mounted below the face of the folding-bed and means for moving said arm outwardly through an opening in the face of said folding-bed to fold over the front flap of the diamond fold.

51. The combination of a revoluble folding-bed, means for holding a bag-blank thereon, means for forming the diamond fold on the bag-blank, a front-flap-lifter mounted below the face of the folding-bed and means for actuating the front-flap-lifter to lift and turn over the front flap of the diamond fold toward the body of the bag-blank.

52. The combination of a revoluble folding-bed, means for holding a bag-blank thereon, means for forming the diamond fold on the bag-blank, a front-flap-lifter pivotally mounted below the face of the folding-bed, and means for swinging the front-flap-lifter upwardly through an opening in the face of said folding-bed to lift and turn over the front-flap of the diamond fold toward the body of the bag-blank.

CHARLES B. STILWELL.

Witnesses:
 ARNOLD KATZ,
 ERNEST H. HOBBS.